United States Patent
Eguchi et al.

(10) Patent No.: US 9,674,408 B2
(45) Date of Patent: Jun. 6, 2017

(54) IMAGE PICKUP APPARATUS THAT UTILIZES A REFOCUSABLE RANGE, IMAGE PROCESSING METHOD, AND RECORDING MEDIUM

(71) Applicant: CANON KABUSHIKI KAISHA, Tokyo (JP)

(72) Inventors: Kaoru Eguchi, Utsunomiya (JP); Koshi Hatakeyama, Tokyo (JP); Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/681,340

(22) Filed: Apr. 8, 2015

(65) Prior Publication Data

US 2015/0304544 A1  Oct. 22, 2015

(30) Foreign Application Priority Data

Apr. 16, 2014  (JP) ................................. 2014-084224

(51) Int. Cl.
*H04N 5/225* (2006.01)
*H04N 5/232* (2006.01)

(52) U.S. Cl.
CPC ....... *H04N 5/2251* (2013.01); *H04N 5/23212* (2013.01); *H04N 5/23293* (2013.01)

(58) Field of Classification Search
None
See application file for complete search history.

(56) References Cited

U.S. PATENT DOCUMENTS

| 2010/0141802 A1* | 6/2010 | Knight ................ H04N 5/2252 348/240.3 |
| 2010/0232776 A1 | 9/2010 | Ohnishi |
| 2013/0222633 A1 | 8/2013 | Knight et al. |

(Continued)

FOREIGN PATENT DOCUMENTS

| JP | 59146029 A | 8/1984 |
| JP | 2011109310 A | 6/2011 |
| JP | 4766133 B2 | 9/2011 |

OTHER PUBLICATIONS

Ng et al., "Light Field Photography with a Hand-held Plenoptic Camera," Stanford Tech Report CTSR (Computer Science Technical Report), 2005, pp. 1-11.

(Continued)

*Primary Examiner* — Justin P Misleh
(74) *Attorney, Agent, or Firm* — Rossi, Kimms & McDowell LLP

(57) ABSTRACT

An image pickup apparatus includes an image sensor, and a controller configured to drive a focus unit so that a first position is focused, to acquire first information on a first refocusable range that is available in an image that is captured while the first position is being focused by the focus unit, to acquire second information on a second refocusable range that contains the first position, to acquire information on a second position on which the focus unit is to be focused so as to provide the second refocusable range using the first information and the second information, and make the image sensor capture an image while the second position is being focused by the focus unit.

13 Claims, 14 Drawing Sheets

WHEN BACK PRIORITY MODE IS DESIGNATED

(56) References Cited

U.S. PATENT DOCUMENTS

| | | | | |
|---|---|---|---|---|
| 2013/0342752 A1* | 12/2013 | Sugawara | .......... | H04N 5/23212 |
| | | | | 348/349 |
| 2014/0240578 A1* | 8/2014 | Fishman | ............ | H04N 5/23293 |
| | | | | 348/333.08 |
| 2015/0054972 A1* | 2/2015 | Hashimoto | .............. | G02B 7/34 |
| | | | | 348/216.1 |
| 2015/0055010 A1* | 2/2015 | Eguchi | ................... | G03B 13/36 |
| | | | | 348/349 |

OTHER PUBLICATIONS

Georgiev et al., "Superresolution with Plenoptic 2.0 Cameras," Optical Society of America, 2009, pp. 1-3.
Isaksen et al., "Dynamically Reparameterized Light Fields," Proceedings of the 27th Annual Conference on Computer Graphics and Interactive Techniques, ACM SIGGRAPH, 2000, pp. 297-306.
Ng, "Fourier Slice Photography" ACM Transactions on Graphics (TOG)—Proceedings of ACM SIGGRAPH 2005, (2005), pp. 735-744, vol. 24.

\* cited by examiner

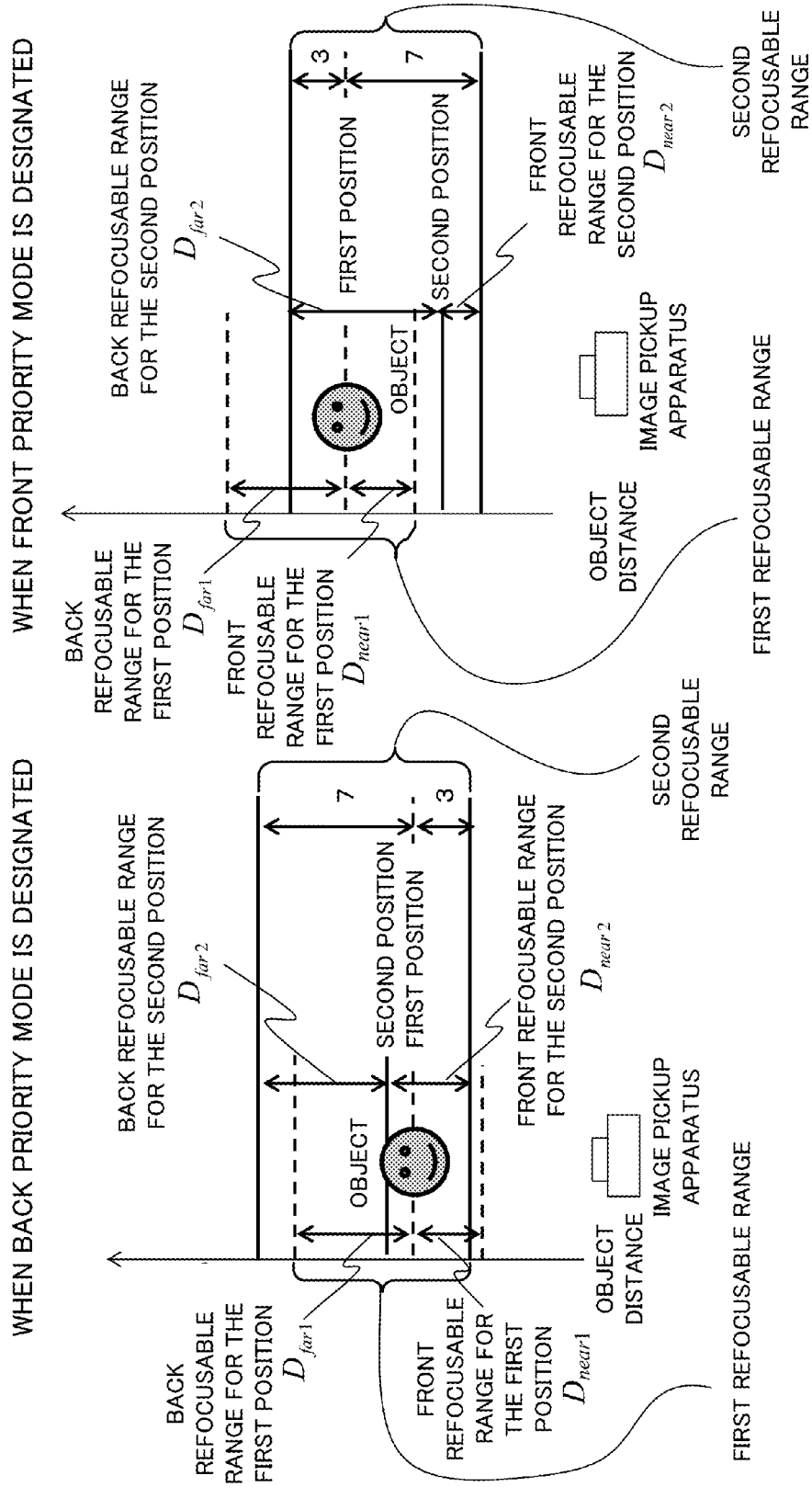

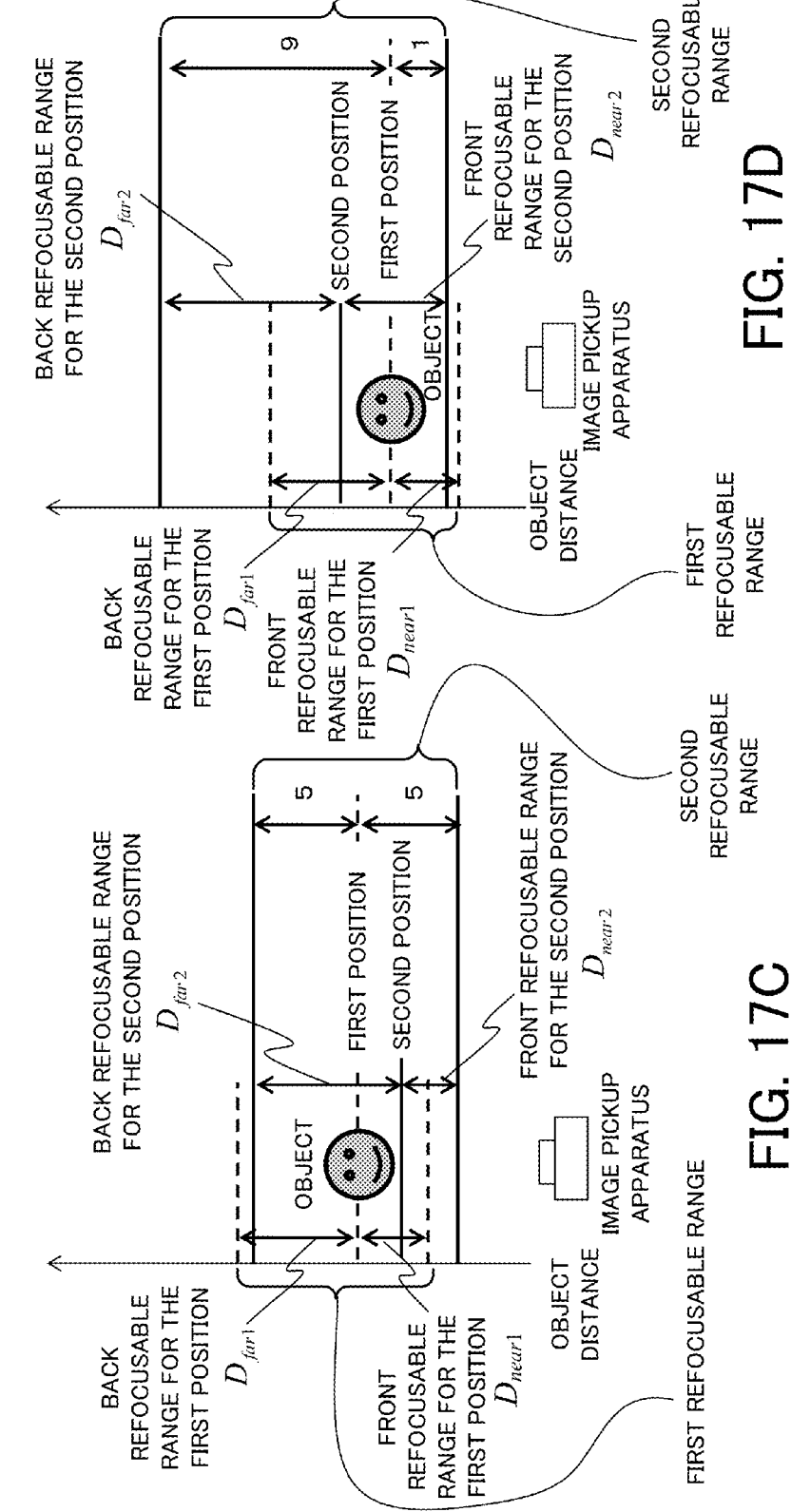

IMAGE PICKUP APPARATUS THAT UTILIZES A REFOCUSABLE RANGE, IMAGE PROCESSING METHOD, AND RECORDING MEDIUM

BACKGROUND OF THE INVENTION

Field of the Invention

The present invention relates to an image pickup apparatus, an image processing method, and a recording medium for refocus processing.

Description of the Related Art

Each of Ren Ng et al., "Light Field Photography with a Hand-held Plenoptic Camera," 2005 Computer Science Technical Report CTSR, Todor Georgiev et al., "Superresolution with Plenoptic 2.0 Camera," 2009 Optical Society of America, Aaron Isaksen et al., "Dynamically Reparameterized Light Fields," ACM SIGGRAPH, pp. 297-306 (2000) discloses a differently structured image pickup apparatus configured to simultaneously obtain both a two-dimensional intensity distribution of light and angular information of a ray in an object space using the "light field photography." Herein, the two-dimensional intensity distribution of the light and the angular information of the ray will be collectively referred to as a light field, and three-dimensional information can be acquired by obtaining the light field. The above image pickup apparatuses can provide a change of a focused position of an image, which is referred to as refocus, a change of a capturing viewpoint, and an adjustment of a depth of field, etc. using the light field and image processing to the captured image.

Japanese Patent Laid-Open No. 2011-109310 discloses an applied example of a refocus function as assistance of autofocus. Japanese Patent Laid-Open No. 59-146029 discloses a method for capturing an image by shifting a focused position with a depth of field determined by a diaphragm so as to include a plurality of objects in the depth of field. Japanese Patent No. 4766133 discloses a method for enabling many objects to be refocused by calculating an object distribution on an image plane.

The above refocus function enables a focused position in a captured image to be changed, but a refocusable range is limited (depending upon the specification of the image pickup apparatus) and a focused position cannot be changed to a fully arbitrary position. In addition, a distance in the optical axis direction of a front (camera side) refocusable range of a position focused by a focus unit is different from that of a back (background side) refocusable range of the position focused by the focus unit. Hence, a user may not change the focused position in the captured image as desired. Japanese Patent Laid-Open No. 2011-109310 discloses a method for shifting the focus position using the focus unit when the object is located outside the refocusable range, but is silent about a method for effectively utilize the refocusable range.

In order to capture an image focused on a plurality of objects, Japanese Patent Laid-Open No. 59-146029 shifts the initial focused position to another focused position before capturing an image, and then captures the image. This method can provide the image focused on the plurality of objects (with a deeper depth of field than that with a single object), but cannot provide an image in which a user desired position is focused and other parts are defocused. This reference is also silent about the method for effectively utilizing a refocusable range.

Japanese Patent No. 4766133 calculates an image plane shift amount for each focus detecting position on the image plane, specifies areas of the objects by considering a distribution of the image plane shift amount, and controls the focus unit so that all objects are included in the refocusable range. However, as the number of focus detecting positions increase, the calculation cost used to calculate the image plane distribution increases. Moreover, the object calculated from the image plane shift distribution may not necessarily be an object intended by the user. This reference is also silent about the method for effectively utilizing a refocusable range.

SUMMARY OF THE INVENTION

The present invention provide an image pickup apparatus, an image processing method, and a recording medium, which can effectively utilize a refocusable range.

An image pickup apparatus according to the present invention includes an image sensor, and a controller configured to drive a focus unit so that a first position is focused, acquire first information on a first refocusable range that is available in an image if the image is captured while the first position is focused, acquire second information on a second refocusable range that contains the first position, acquire information on a second position to be focused so as to provide the second refocusable range using information of the first position, the first information, and the second information, and make the image sensor capture an image while the second position is focused.

Further features of the present invention will become apparent from the following description of exemplary embodiments with reference to the attached drawings.

BRIEF DESCRIPTION OF THE DRAWINGS

FIGS. 17A to 17D are views of illustrative image pickup scenes according to the first to fourth embodiments of the present invention.

DESCRIPTION OF THE EMBODIMENTS

Figure 1:
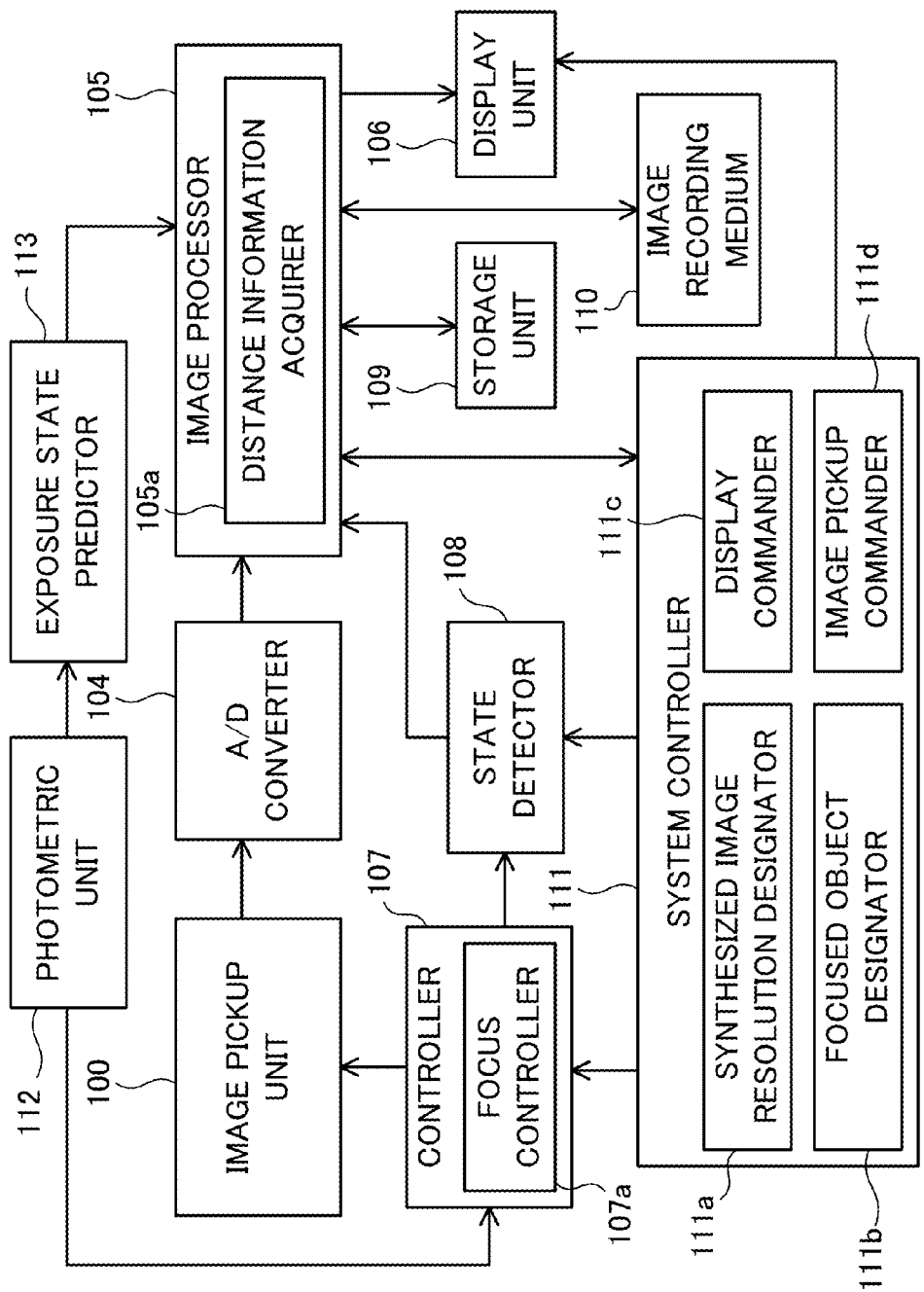
FIG. 1 is a block diagram of an image pickup apparatus according to first to third embodiments according to the present invention.

Referring now to the accompanying drawings, a description will be given of embodiments of the present invention. The corresponding elements in each figure are designated by the same reference numerals, and a duplicate description thereof will be omitted.

Figure 2:
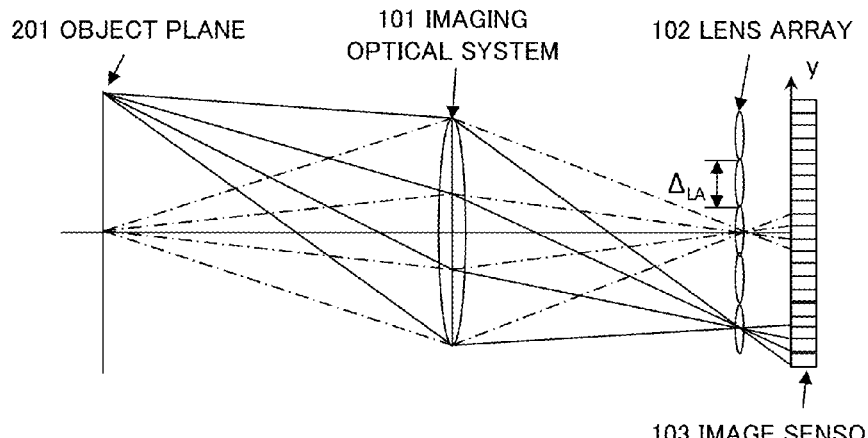
FIG. 2 is a schematic block diagram of an image pickup unit according to the first embodiment of the present invention.
Figure 3:
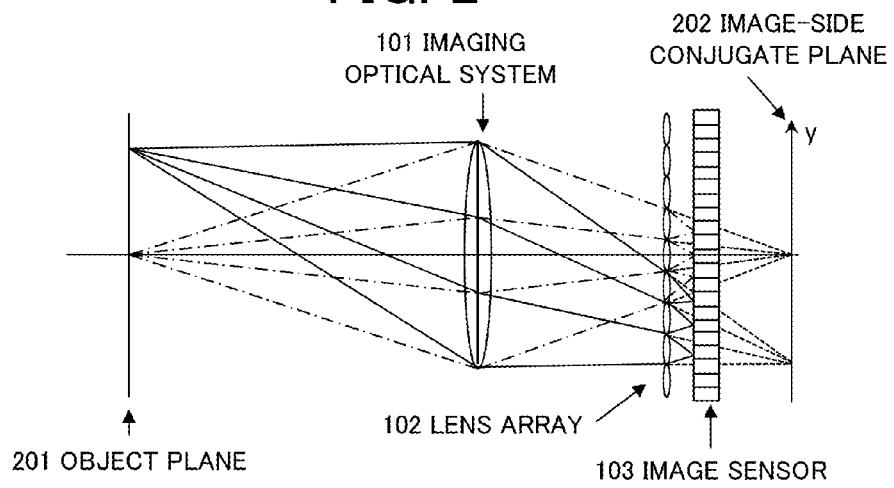
FIG. 3 is a schematic block diagram of an image pickup unit according to the second embodiment of the present invention.
Figure 4:
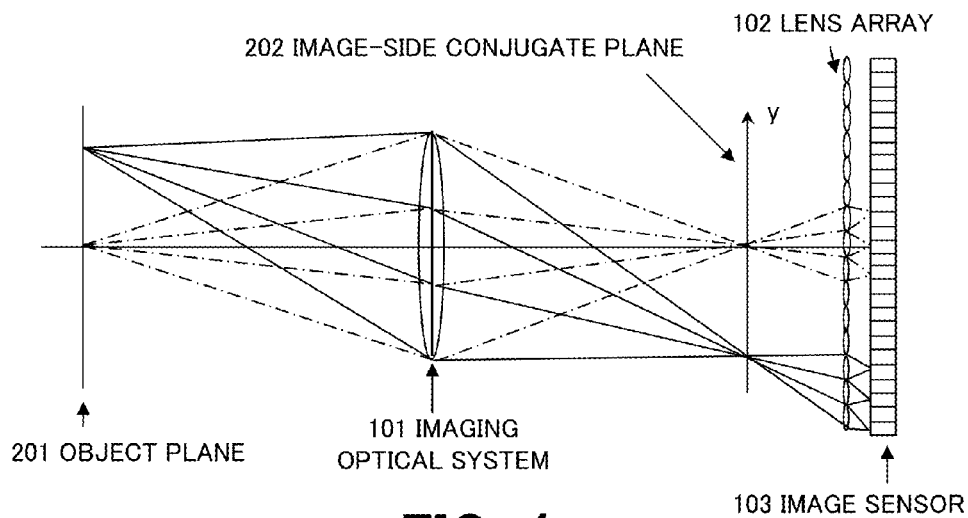
FIG. 4 is a schematic structural view of a variation of the image pickup unit illustrated in FIG. 3.
Figure 5:
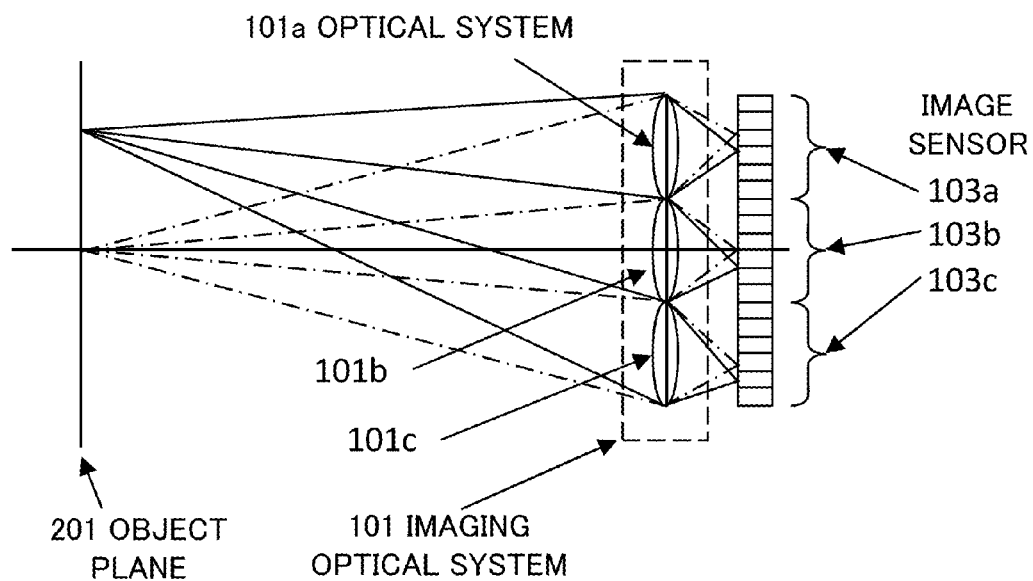
FIG. 5 is a schematic structural view of an image pickup unit according to the third embodiment of the present invention.

The image pickup unit according to this embodiment of the present invention obtains a plurality of parallax images or the light field captured at a plurality of viewpoints in the object space. In other words, the image pickup unit according to this embodiment of the present invention can acquire a two-dimensional intensity distribution of light and angular information of a ray in an object space. The "object space," as used herein, is a real space in an angle of view that can be obtained by the image pickup apparatus according to the present invention. An illustrative image pickup unit may have a structure in which a lens array is arranged on the image side of the imaging optical system as illustrated in FIGS. 2 to 4, and a structure in which a plurality of imaging optical systems are arranged as illustrated in FIG. 5. Another conceivable method of acquiring the light field is to capture images a plurality of times by changing the position of the image pickup apparatus that includes the imaging optical system and the image sensor. In this case, parallax images of the object space are captured at different time. Correct parallax information cannot be obtained when a moving object exists in the object space. Accordingly, the image pickup unit may have a structure configured to simultaneously acquire a plurality of parallax images as illustrated in FIGS. 2 to 5.

The parallax images obtained by the structure illustrated in FIGS. 2 to 5 can enable refocusing, depth-of-field controls, and viewpoint changes, etc. through processing such as an extraction and rearrangement of a pixel, and synthesis. In this embodiment, the above processing will be referred to as a reconstruction and an image generated by the reconstruction will be referred to as a reconstructed image. In particular, an image that has received the refocus processing will be referred to as a refocused image. The refocused image may receive processing such as a noise reduction, and reconstruction processing such as the depth-of-field control.

The following description uses a linear system for simplicity, but may be applied to a two-dimensional system.

First Embodiment

A description will be given of an image pickup apparatus according to a first embodiment of the present invention. FIG. 1 is a basic structure of the image pickup apparatus according to the present invention.

An image pickup unit 100 includes, as illustrated in FIG. 2, an imaging optical system 101, a lens array 102, an image sensor 103. A detailed description will be given of the image pickup unit 100 later. The image sensor 103 is a two-dimensional image sensor, such as a charge coupled device ("CCD") and a complementary metal-oxide semiconductor ("CMOS"). The energy of light that enters the image sensor 103 through the imaging optical system 101 and the lens array 102 is converted into an analogue electric signal. The analogue signal is converted into a digital signal by an A/D converter 104. An image processor 105 performs predetermined processing for the digital signal to generate a displayed image. The image processor 105 serves as an acquirer configured to acquire image data (a plurality of parallax image data) from the image pickup unit 100. The image processor 105 serves as an image processing apparatus configured to perform image generating processing, such as refocus processing, which will be described later, for captured data obtained by the image pickup unit 100. The image processing apparatus may be provided as a PC or dedicated apparatus outside the image pickup apparatus. A detailed description of the image processor 105 will be given later. The generated displayed image is output to a display unit 106, such as a liquid crystal display. The user views the displayed image (live-view image), and captures an image while confirming an image to be captured. The display unit 106 may have a touch screen function, and may receive an instruction input from the user using the touch screen. The displayed image is generated with an image acquisition condition, information from an exposure state predictor 113 and a storage unit 109, distance information obtained by a distance information acquirer 105, etc. The image acquisition condition contains a structure of the image pickup unit 100, the exposure state, such as the diaphragm, an in-focus position, a focal length of a zoom lens, etc. when the analogue signal is obtained. A state detector 108 may directly acquire the image acquisition condition from the system controller 111, and the information relating to the structure of the image pickup unit 100 from the controller 107. In this embodiment, the storage unit 109 stores the information relating to the structure of the image pickup unit 100. The exposure state predictor 113 predicts an exposure state for the image pickup based on information of a photometric unit 112. The distance information acquirer 105a obtains object distance information of the object space from the input parallax information.

The system controller 111 includes a display commander 111c, and the display unit 106 displays and does not display the displayed image in accordance with a signal from the display commander 111c. For example, when the image pickup apparatus has a release button and the user presses it to a first switch position, the display commander 111c instructs the displayed image to be displayed. When the release button is then pressed to a second switch position deeper than the first switch position, image pickup is executed. However, the present invention is not limited to this embodiment, and the display commander 111c may send a signal in another way. The system controller 111 includes a focused object designator 111b configured to designate an object to be focused. In response to the signal from the focused object designator 111b, the focus controller 107a in the controller 107 drives the focus unit including a focus lens and its driver in the image pickup unit 100 so as to focus on the designated object. Before the image pickup commander 111d executes image pickup, the controller 107 adjusts exposure of the image pickup unit 100 based on information of the photometric unit 112 and then the image pickup is executed. At this time, the image acquired by the image sensor 103 is input into the image processor 105 through the procedure similar to the above procedure, receives predetermined processing, and is stored in the image recording medium 110, such as a semiconductor memory, in a predetermined format. At the same time, the image acquisition condition used for the image pickup, which is obtained from the state detector 108, is also recorded. Moreover, the image recorded in the image recording medium 110 may be a reconstructed image.

In displaying the image stored in the image recording medium 110 on the display unit 106, the image processor 105 processes the image based on the image acquisition condition used for the image pickup. As a result, the display unit 106 displays the image that has been reconstructed with a desired setting, such as a resolution, viewpoint, focused position, and depth of field. The resolution of the reconstructed image is designated by the synthesized image resolution designator 111a. The storage unit 109 may previously store the desired setting for quick processing, and the reconstructed image may be displayed on the display unit 106 without intervening the image recording medium 110.

While the image pickup apparatus includes other components, they are not principal elements for this embodiment and thus a description thereof will be omitted. The system controller 111 performs the above series of controls.

Next follows a description of the structure of the image pickup unit 100 according to the first embodiment. The image pickup unit 100 has a configuration illustrated in FIG. 2. The lens array 102 is arranged on an image-side conjugate plane of the imaging optical system 101 to the object plane 201. The lens array 102 is configured so that the exit pupil of the imaging optical system 101 and the image sensor 103 have an approximately conjugate relationship. The ray from the object plane 201 passes through the imaging optical system 101 and the lens array 102, and enters a different pixel on the image sensor 103 in accordance with the position and angle of the ray on the object plane 201. Thereby, the parallax image data (light field data) is obtained. The lens array 102 serves to prevent rays that have passed different positions on the object plane 201 from entering the same pixel. As a result, the image sensor 103 can acquire an image in which the same area on the object plane 201 has been captured at a plurality of viewpoints.

Figure 6:
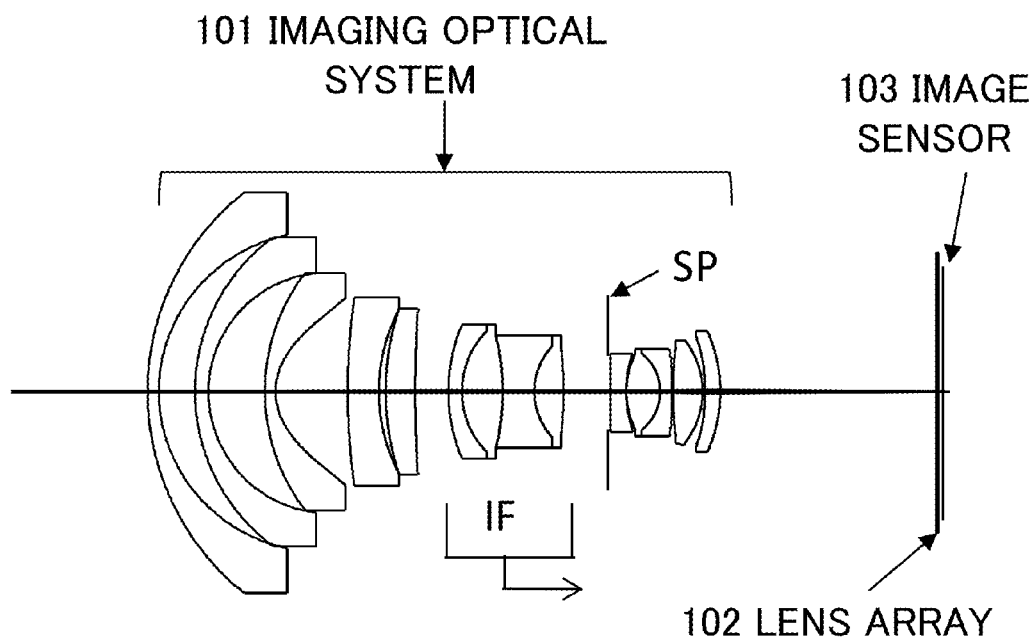
FIG. 6 is a sectional view of the image pickup unit according to the first embodiment of the present invention.

FIG. 6 is a sectional view of the image pickup unit 100 according to the first embodiment. The imaging optical system 101 illustrated in FIG. 6 is a single focus lens. The focus unit IF moves on the optical axis for focusing. SP denotes an aperture diaphragm. The lens array 102 includes a fixed single lens according to this embodiment but may include a plurality of lenses or a liquid lens, a liquid crystal lens, and a diffractive optical element. A micro lens in the lens array 102 according to the first embodiment may have a biconvex shape but may have a plane or aspheric shape on one surface.

A description will now be given of the refocus processing. Ren Ng, "Fourier Slice Photography" ACM Trans. Graph. 24, pp. 735-744 (2005) discloses the refocus in detail, and thus a brief description thereof will now be given. The basic principle of the refocus is common to any structures illustrated in FIGS. 2 to 5. Herein, the structure illustrated in FIG. 2 will be used for an example. In FIG. 2, the pupil of the imaging optical system is two-dimensionally divided into nine (three for one dimension), and nine viewpoints of images are obtained. Herein, an image corresponding to the divided pupil will be referred to as a single viewpoint image. These nine single viewpoint images mutually have parallaxes and a relative positional relationship of the object on the image changes in accordance with the object distance. When single viewpoint images are synthesized so that a certain object can be overlapped, the objects located at different object distances are synthesized while they shift from each other. Due to this shift, the objects located at different object distances blur. The blur at this time is determined by the pupil corresponding to the single viewpoint image used for the synthesis, and when all nine images are synthesized, the blur of the image captured by the imaging optical system 101 can be reproduced. Since the arbitrary objects are overlapped in the synthesis of the single viewpoint images, an image captured while the arbitrary object is being focused by the imaging optical system 101 may be reproduced. This is the principle of focus control in the captured image or the refocus.

Figure 11:
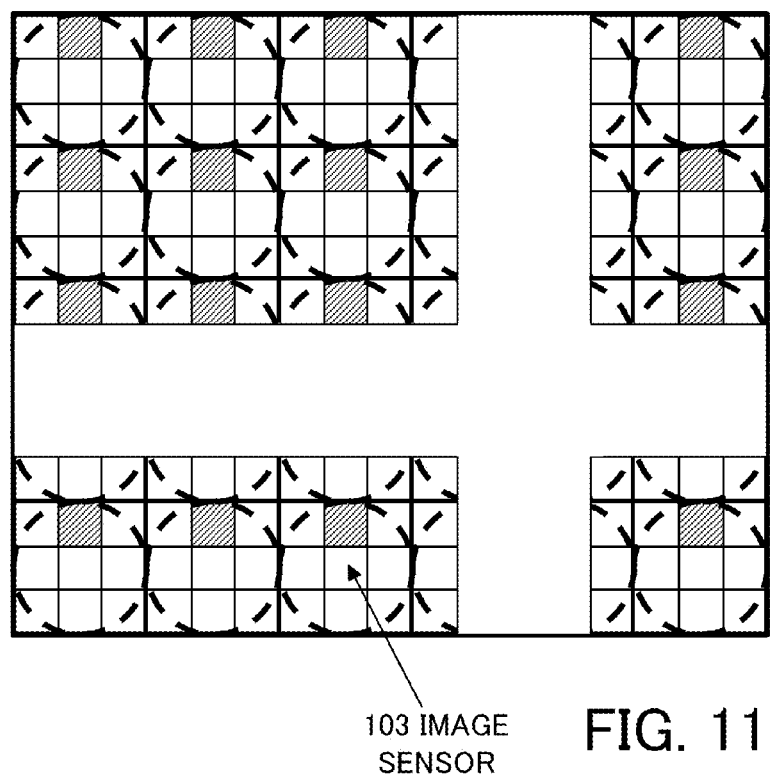
FIG. 11 is an explanatory view of generating a refocused image according to the first embodiment of the present invention.

A description will now be given of a generating method of a single viewpoint image according to the first embodiment. FIG. 11 is a view illustrating a relationship between the lens array 102 and the image sensor 103 illustrated in FIG. 3. A broken-line circle represents a pixel area which the light that has passed one micro lens enters. In FIG. 11, micro lenses are arranged in grating but the arrangement of the micro lenses is not limited. For example, it may be arranged like a honeycomb having sextet symmetries, or each micro lens may be slightly shifted from a regular arrangement. An oblique-line hatched area in FIG. 11 represents a pixel which light that has passed the same pupil area of the imaging optical system 101 enters. A single viewpoint image of the object space viewed from the bottom of the pupil in the imaging optical system 101 can be generated by extracting the hatched pixels. Similarly, another single viewpoint image can be generated by extracting pixels having the same relative position to each broken-line circle.

Next follows a description of a refocusable range in which a focus position can be changed in a captured image. Since the refocus is performed by overlapping the single viewpoint images, a defocused object in each single viewpoint image for each single viewpoint image cannot be refocused. Even when the defocus images are overlapped, a high frequency component cannot be obtained and the object is still out of focus. The refocusable range depends upon the divided pupils of the imaging optical system 101. As the pupil is divided into a smaller area, the depth of field of each single viewpoint image becomes deeper and the refocusable range extends. However, the depth of field in the single viewpoint image and the refocusable range do not necessarily accord with each other. This is because the refocusable range changes according to a resolution ratio between the single viewpoint image and the reconstructed image made by reconstructing the single viewpoint images. For example, when the resolution of the reconstructed image is lower than that of the image for each viewpoint, the sampling pitch of the space component in the reconstructed image is larger than that of the single viewpoint image. Therefore, the reconstructed image has a depth of field deeper than that of the single viewpoint image, and the refocusable range accordingly extends. On the other hand, when the resolution of the reconstructed image is higher than that of the single viewpoint image, the refocusable range becomes smaller than the depth of field of the single viewpoint image. It is understood from the above discussion that the refocusable range depends upon the depth of field of the single viewpoint image, and the refocusable ranges before and after the focused position used for the image pickup are different from each other. The refocusable range before the focus position is narrower than the refocusable range after the focus position. In order to obtain the precise refocusable range of the reconstructed image, it is necessary to consider a condition on which the single viewpoint image is reconstructed.

More specifically, the refocusable range of the reconstructed image is calculated. Assume the depth of focus corresponding to the depth of field of the reconstructed image. Assume that $\epsilon$ is a size of a permissible circle of confusion, $\Delta u$ is a sampling pitch of an angular component of a ray. Then, the following expression (1) gives refocus coefficients $\alpha_{\pm}$:

$$\alpha_{\pm} = \frac{1}{1 \pm \varepsilon/\Delta u} \qquad (1)$$

Figure 12:
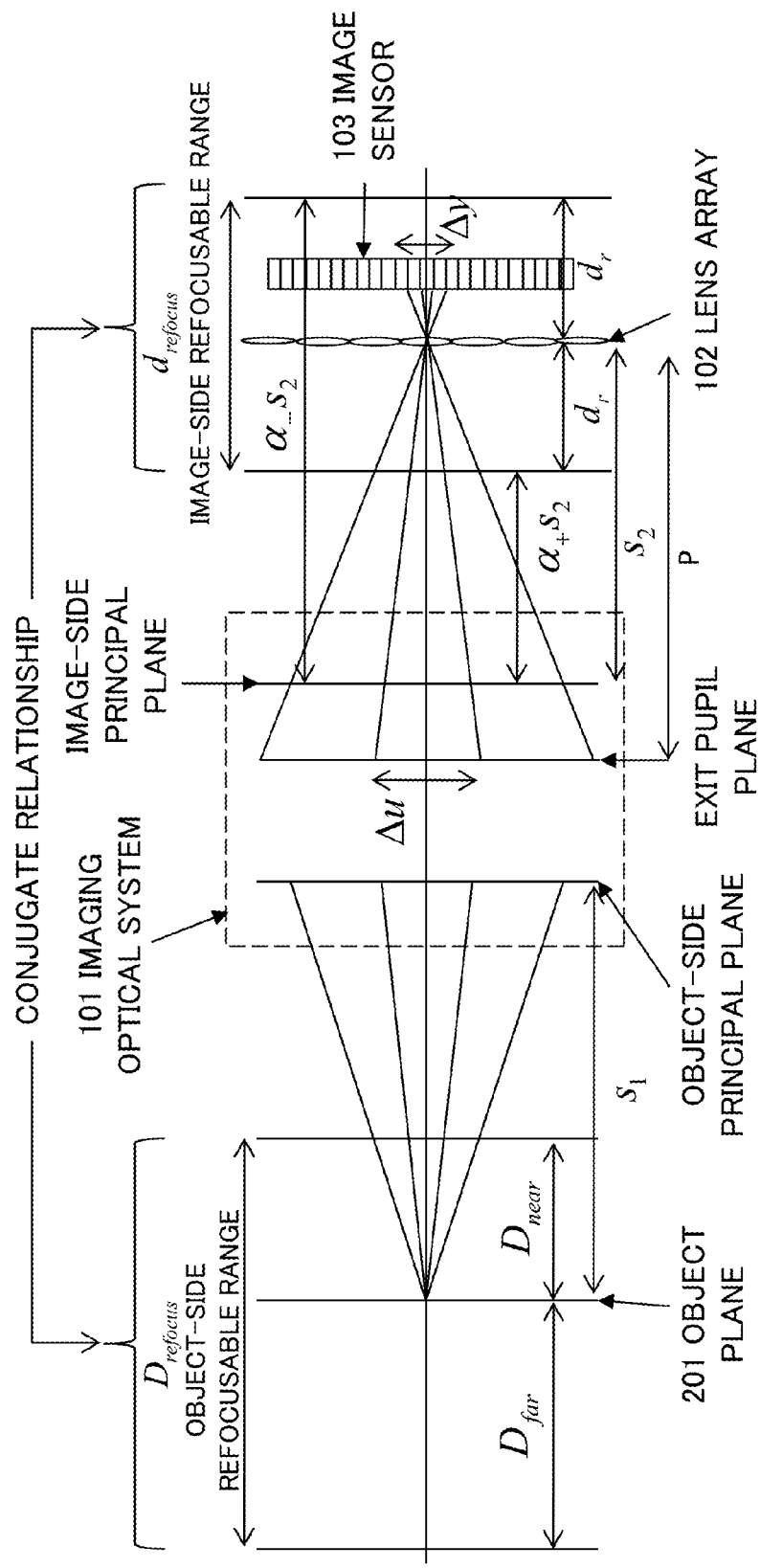
FIG. 12 is an explanatory view of a refocus control range according to the first embodiment of the present invention.

The refocusable range on the image side (image sensor side) expressed with the expression (1) is expressed by a product of $\alpha_{\pm}$ and $s_2$ that is a distance between the image-side principal plane of the imaging optical system 101 and the image-side conjugate plane of the imaging optical system 101 to the object plane 201 or ranges from $\alpha_+ \cdot s_2$ to $\alpha_+ \cdot s_2$. The conjugate range to the imaging optical system 101 is a refocusable range on the object side. As illustrated in FIG. 12, a center position of the refocusable range is the focus position of the imaging optical system 101. In this case, the position of the lens array 102 is the center position of the refocusable range. Each of FIG. 2 to satisfies the expression (1). FIG. 12 illustrates this relationship in the first embodiment. The image-side refocusable range is a range conjugate with the object-side refocusable range via the imaging optical system 101. $\alpha y$ is a sampling pitch of the two-dimensional intensity distribution of light, and corresponds to the pitch $\Delta_{LA}$ of the lens array 102 in the configuration of FIG. 2. The expression (1) can be approximated to the following expression (2), because the pixel pitch $\Delta$ in the image sensor 103 is sufficiently smaller than the exit pupil distance P of the imaging optical system 101.

$$\alpha_{\pm} s_2 = s_2 \mp NF\Delta y = s_2 \mp NF\Delta_{LA} = s_2 \mp NF\epsilon \qquad (2)$$

The exit pupil distance P of the imaging optical system 101 is a distance between the exit pupil plane of the imaging optical system 101 and the image-side conjugate plane of the imaging optical system 101 to the object plane 201. N is the number of linear divisions of the pupil of the imaging optical system 101, and F is an F-number of the imaging optical system 101.

The image-side refocusable range $d_{refocus}$ is expressed as follows based on the expression (2).

$$d_{refocus} = 2NF\epsilon \qquad (3)$$

In order to convert the image-side refocusable range $d_{refocus}$ into the object-side refocusable range, the conjugate range with respect to the imaging optical system 101 may be calculated, for example, by applying a formula for calculating the depth of field.

Now assume that $D_{refocus}$ is an object-side refocusable range, $D_{near}$ is a front refocusable range located on the image pickup apparatus side of the object plane 201 in the object-side refocusable range, and $D_{far}$ is a back refocusable range located on the opposite side of the object plane 201 in the object-side refocusable range separating from the object plane 201. The front refocusable range is located on the front side (camera side) and the back refocusable range is located on the rear side (background side) of the focused position (object plane 201). Assume that $s_1$ is a distance between the object plane 201 and the object-side principal plane of the imaging optical system 101, and f is a focal length when the imaging optical system 101 forms an image at infinity of the object distance. Each symbol is positive irrespective of the direction. Then, the following expressions are established.

$$D_{refocus} = D_{far} + D_{near} \qquad (4)$$

$$D_{far} = \frac{(f - s_1)^2 \times NF\varepsilon}{f^2 + (f - s_1) \times NF\varepsilon} \qquad (5)$$

$$D_{near} = \frac{(f - s_1)^2 \times NF\varepsilon}{f^2 - (f - s_1) \times NF\varepsilon} \qquad (6)$$

Referring now to a flowchart illustrated in FIG. 16, a description will be given of a method of obtaining a desired refocusable range according to one characteristic of the present invention. The flowchart illustrated in FIG. 16 serves as a control method of an image pickup apparatus, and is executed by a controller, such as the system controller 111, the controller 107, and an unillustrated control circuit in the image processor 105. The control method of the image pickup apparatus can be implemented as a program that enables a computer to execute each step. This program may be stored in a non-transitory computer readable medium.

As described above, the refocusable range is finite, and the refocusable ranges before and after the focus position made by the focus unit are different. The user would like to effectively utilize the finite refocusable range depending upon the image pickup scene.

Accordingly, this embodiment provides the image pickup apparatus with means of acquiring and saving "refocusable range setting information (second information)." The storage unit 109 may store the obtained refocusable range setting information. The refocusable range setting information contains information of refocusable range before and after a first position designated by the user. The first position is also contained in a refocusable range for the captured image that is finally obtained.

The refocusable range setting information may contain a value which a user has previously registered in the image pickup apparatus or may select, at the image pickup time, a value from among values stored in the image pickup apparatus. Alternatively, the refocusable range setting information may be transferred from an external apparatus, such as a PC, to the image pickup apparatus. The refocusable range setting information stored in the image pickup apparatus may contain one piece of information or a plurality of pieces of information, and the user may select one of pieces of refocusable range setting information.

Figure 16:
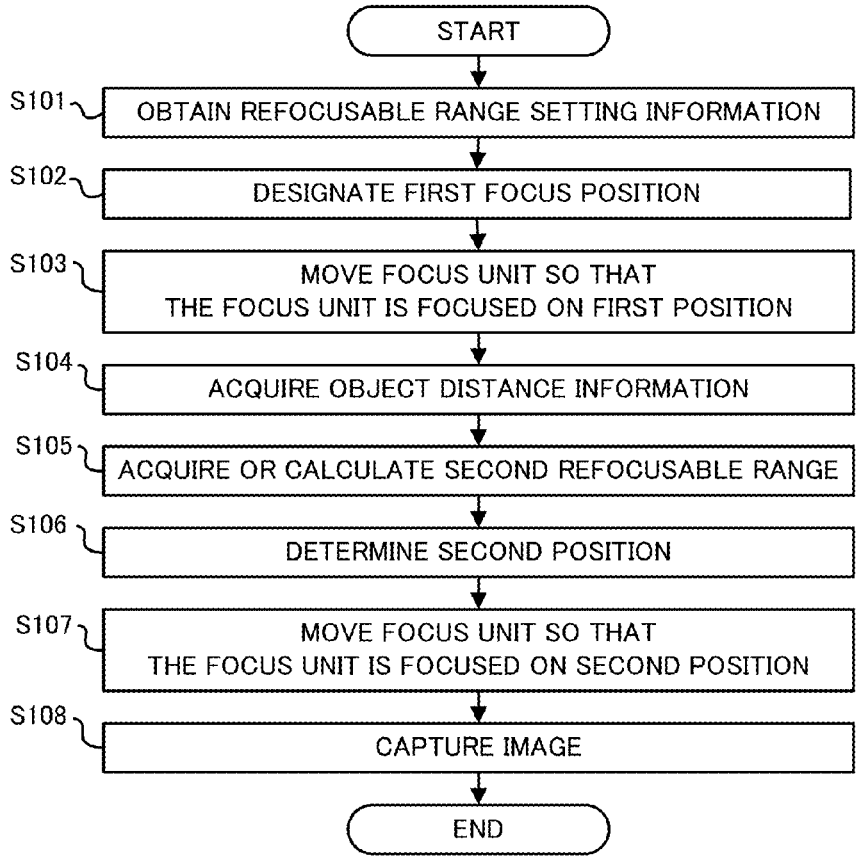
FIG. 16 is an explanatory view of a processing flow at the image pickup time according to the first to fourth embodiments of the present invention.

S101 in the flowchart illustrated in FIG. 16 is the step in which the image processor 105 acquires or recognizes the refocusable range setting information used for the image pickup.

The next step S102 is the step in which the user designates the first position. In this step, the user designates the object to be focused in the image pickup.

The next step S103 is the step of actually driving the focus unit so that the focus unit is focused on the object designated by the user in the step S102. The focusing operation (S103) on the first position enables the user to confirm the image, and the distance information to be obtained from the image pickup apparatus, which would otherwise be unavailable due to the defocus. As described later, this step is a preliminary step of obtaining information on the object distance information from the image pickup apparatus to the first position, and information on the refocusable ranges before and after the first position. The step S103 is unnecessary when the autofocus of a phase difference detecting method (phase difference AF) is performed. The phase difference AF is a method for calculating a driving distance of the focus unit using the parallax image, and it is unnecessary to actually drive the focus unit so as to calculate the distance. Once the driving distance of the focus unit is known, the distance between the image pickup apparatus and the first position is found. In this case, the step S103 may be omitted.

The next step S104 is the step of obtaining object distance information from the image pickup apparatus to the first position. A method for obtaining the (object) distance between the image pickup apparatus and the first position is different according to the focus detecting method. Since the phase difference AF has been described, a contrast AF and manual focusing will be now described. The contrast AF is also referred to as a peak searching method (mountain-climbing method) for determining an in-focus position by automatically driving the focus unit based on the contrast of the image obtained by the image pickup apparatus. The manual focusing is a method in which a user drives the focus unit and determines the in-focus position by himself. When these methods are used, the object distance from the image pickup apparatus to the first position can be calculated based on the moving distance of the focus unit.

The moving distance of the focus unit corresponding to the object distance from the image pickup apparatus to the first position is determined based on the specification of the imaging optical system in the image pickup unit. This moving distance is geometrically found through a calculation and the calculation may be made whenever necessity arises. The information on the object distance may be acquired by referring to a table that defines a relationship among the moving distance of the focus unit and the object distance from the image pickup apparatus to the first position.

This embodiment actually moves the focus unit so that the focus unit is focused on the first position in the step of S103, and acquires the information on the object distance from the image pickup apparatus to the first position in the step S104.

The method for acquiring the distance information is thus slightly different according to the focus detecting method, and the distance information may be acquired without using the focus unit. For example, the conventional depth from defocus ("DFD") or distance measuring unit using the infrared light may be used to obtain the distance information.

Next, the step S105 calculates the refocusable ranges before and after the first position based on the distance information obtained at the step S104 using the image processor 105.

As described above, the refocusable range varies according to the resolution ratio between each single viewpoint image and the reconstructed image, but now assume that the resolution ratio is 1 for simple description. When the image-side refocusable range falls within the range defined by the expression (2), the refocusable range has already been obtained. A distance $d_r$ in the optical axis direction between the image-side conjugate plane of the imaging optical system 101 to the object plane 201 and the boundary of the image-side refocusable range may satisfy the following expression (7). Herein, $d_r$ represents a distance and its sign is positive irrespective of its direction.

$$d_r \leq NF\epsilon \quad (7)$$

Figure 18:
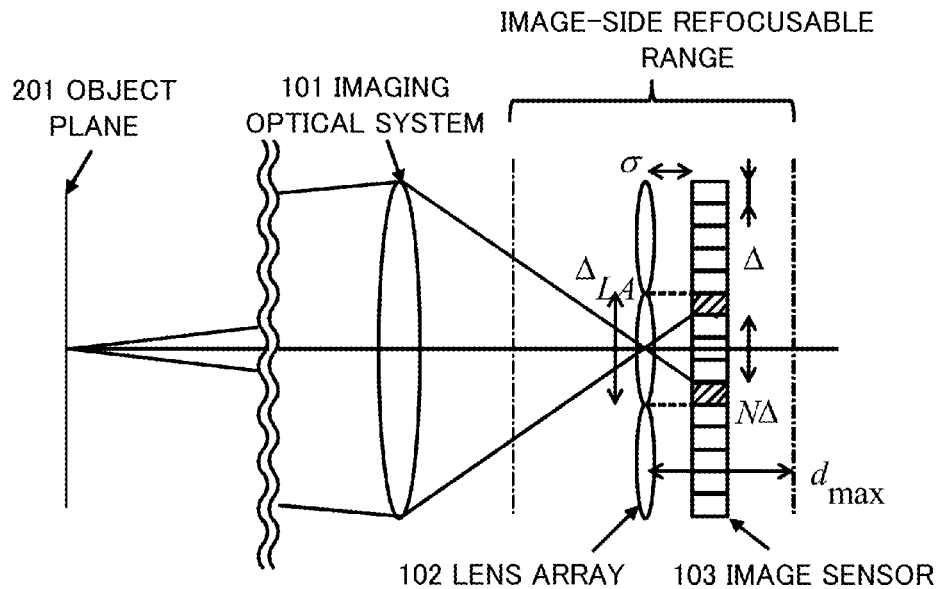
FIG. 18 is an explanatory view of an optical arrangement of the image pickup unit according to the first embodiment of the present invention.

It is understood from FIG. 18 that $NF=\sigma/\Delta$. FIG. 18 illustrates a relationship among the parameters in the configuration of FIG. 2, and $\sigma$ is a distance between the image-plane principal plane of the lens array 102 and the image sensor 103. The broken line in FIG. 18 represents an area of the image sensor 103 corresponding to one micro lens, and an oblique-line hatched pixel represents the dead zone which no light enters. The first embodiment arranges the lens array 102 so as not to cause the dead zone. In this case, $\Delta_{LA}=N\Delta$. The present invention is not limited to this embodiment, and the dead zone may exist. The expression (7) may be rewritten as the following expression (8) by characterizing a size of the permissible circle of confusion which determines the depth of focus using the sampling pitch $\Delta y = \Delta_{LA}$ of the spatial component.

$$\frac{d_r}{NF\Delta_{LA}} = \frac{d_r \Delta}{\Delta_{LA}\sigma} \leq \frac{\epsilon}{\Delta_{LA}} \quad (8)$$

Now assume a general case in which the resolution between the single viewpoint image and the reconstructed image is different. The angle of view of the reconstructed image is identical to the angle of view of the single viewpoint image used for the reconstruction. When the resolution ratio is not 1, $\Delta y$ is different between them. In general, the permissible circle of confusion becomes smaller as $\Delta y$ becomes smaller, and vice versa. Therefore, the expression (8) may be expanded to the following expression (9) using the ratio of $\Delta y$ between the single viewpoint image and the reconstructed image.

$$\frac{d_r \Delta}{\Delta_{LA}\sigma} \leq \frac{\epsilon}{\Delta_{LA}} \sqrt{\frac{R_{mono}}{R_{synth}}} \quad (9)$$

Herein, $R_{mono}$ is the resolution of the single viewpoint image used for the synthesis. $R_{synth}$ is the resolution of the reconstructed image. The ratio of $\Delta y$ is determined by calculating the square root for the ratio between $R_{mono}$ and $R_{synth}$. It is understood from FIG. 18 that the resolution $R_{mono}$ of the single viewpoint image is expressed by the following expression (10).

$$R_{mono} = \left(\frac{\Delta}{\Delta_{LA}}\right)^2 R_{total} \quad (10)$$

$R_{total}$ is the number of effective pixels in the image sensor 103. The following conditional expression (11) which the image-side refocusable range needs to satisfy is as follows based on the expressions (9) and (10).

$$0.0 < \frac{d_r}{\sigma}\sqrt{\frac{R_{synth}}{R_{total}}} \leq 10.0 \quad (11)$$

The refocusable range in the captured image can be obtained by setting the image-side refocusable range in the range defined by the conditional expression (11). Theoretically, the conditional expression cannot have a value of 0. Since the focus control is unavailable when the conditional expression (11) has a value of 0, the value cannot be lower than the lower limit of the conditional expression (11). The upper limit of the conditional expression (11) represents a spread of point image at the focused position in the reconstructed image, and refocus becomes sharper as the value is smaller. When the value exceeds the upper limit in the conditional expression (11), the point image spreads too widely to cause defocus even at the focused position. In other words, the refocus is unavailable.

The following expression (11a) may be satisfied for a sharper reconstructed image.

$$0.0 < \frac{d_r}{\sigma}\sqrt{\frac{R_{synth}}{R_{total}}} \leq 6.0 \quad (11a)$$

The following expression (11b) may be satisfied for a sharper reconstructed image.

$$0.0 < \frac{d_r}{\sigma}\sqrt{\frac{R_{synth}}{R_{total}}} \leq 3.0 \quad (11b)$$

Table 1 indicates a value of the conditional expression (11) according to the first embodiment. The number of effective pixels of the image sensor 103 is $R_{total}=46.7\times10^6$ (pix), and the distance between the image-side principal plane of the lens array 102 and the image sensor 103 is $\sigma=0.0374$ (mm). Herein, "pix" is a unit of the number of pixels. The pixel pitch of the image sensor 103 is $\Delta=0.0043$ (mm), and the pitch of the lens array 102 is $\Delta_{LA}=0.0129$ (mm). The focal length of the imaging optical system 101 is f=14.0 (mm), the F number is F=2.9, and the number of linear pupil divisions is N=3. The synthesized image resolution designator 111a can select the resolution of the reconstructed image $R_{synth}$ from among three types such as $8.0\times10^6$ pix, $5.2\times10^6$ pix, and $2.0\times10^6$ pix. Table 1 indicates a values of $d_r$ for each resolution. In order to generate the reconstructed image having a resolution of $8.0\times10^6$ pix from the single viewpoint image having a resolution of $5.2\times10^6$ pix, a high resolution scheme using the pixel shift super-resolution etc. may be necessary. The resolution of the reconstructed image may have a value different from the above values, and the number of types is not limited to three. However, $d_r$ is determined so as to satisfy the conditional expression (7).

The method for calculating the refocusable range has been described, but the processing load becomes excessive when it is calculated every image pickup. As a solution for this problem, the storage unit 109 may previously store the table of the refocusable range for each image acquisition condition, and the corresponding data may be read instead of calculating the refocusable range. Since the table can contain only discrete data, the solution may be calculated through interpolation processing unless the table has the solution. Alternatively, the refocusable range data may be stored as a function of the focus lens position and the object distance. The storage unit 109 may store information of the refocusable range to the predetermined focused position.

Another conceivable method for obtaining the refocusable range is to actually generate a refocused reconstructed image and to evaluate the contrast of the object corresponding to the focused position. However, this method takes a long time for processing because this method generates the reconstructed image while moving the object position and sequentially determines whether the proper refocus is available. In addition, this method cannot obtain the precise refocusable range unless there is an object at the refocused position, because the evaluation is unavailable without the object. Thus, the above method is suitable for acquiring the refocusable range.

Turning back to the flowchart of FIG. 16, the next step S106 is a step of determining the second position to be focused. This step determines the second position based on the refocusable setting information obtained in the step S101, information (first information) on the first position designated in the step S102, and the first refocusable range corresponding to the first position. The first refocusable range would be available in an image if the image is captured while the first position is being focused by the focus unit. The focus unit is actually driven so that the focus unit is focused on the determined second position. Next follows a description of the method for determining the second position. For example, assume that the refocusable range setting information is preset in the image pickup apparatus and selected by the user at the image pickup time. The conceivable mode contains (A) back priority mode, (B) front priority mode, (C) equal distance mode, (D) ratio customized mode, etc. Each mode will be described with reference to FIGS. 17A to 17D. A manufacturer sets concrete values for FIGS. 17A to 17C, and a user inputs an arbitrary value (or selects a preset ratio) for FIG. 17D. For example, FIG. 17A illustrates an example in which the second position corresponding to a second refocusable range is set so that the width of the front refocusable range before the first position in the optical axis direction and the width of the back refocusable range after the first position in the optical axis direction in the second refocusable range can satisfy a ratio of 3:7. $D_{near1}$ is a front refocusable range that is located in front of the first position viewed from the image pickup apparatus, and $D_{far1}$ is a back refocusable range that is located behind the first position viewed from the image pickup apparatus. Assume that the width ratio between the front and back refocusable ranges is $D_{near1}:D_{far1}=4:6$. It is understood that current $D_{far1}$ runs short. Accordingly, in order to extend the back refocusable range, the focused position is moved to the backside of the first position so that a width ratio before and after the first position in the second refocusable range can be 3:7. The second refocusable range would be available in an image if the image is captured while the second position is being focused by the focus unit. In other words, the second position on which the focus unit is to be focused so as to provide the second refocusable range is set so that the refocusable ranges before and after the first position can satisfy the refocusable range setting information in the second refocusable range. The second position is located on a wider side of the refocusable ranges before and after the first position. A method for determining the second position may actually move the focus unit little by little, and geometrically calculate the refocusable ranges. Alternatively, the storage unit 109 may store the refocusable ranges before and after the arbitrary position, and the second position may be determined by referring to the table. FIG. 17B illustrates an example in which the second position on which the focus unit is to be focused so as to provide the second refocusable range is set so that the width of the front refocusable range before the first position in the optical axis direction and the width of the back refocusable range after the first position in the optical axis direction in the second refocusable range can satisfy a ratio of 7:3. Similar to the above description, assume that $D_{near1}:D_{far1}=4:6$. It is understood that current $D_{near1}$ runs short. Accordingly, in order to extend the front refocusable range, the position is moved to the front side of the first position so that a ratio before and after the first position in the second refocusable range can be 7:3. The second position may be determined by the method similar to that for FIG. 17A. However, the ratio is not limited in FIGS. 17A and 17B. FIG. 17C illustrates an example in which the second position is set so as to satisfy 5:5. FIG. 17D is a mode in which the user sets this ratio. He can set the second position so as to satisfy an extreme ratio of 1:9 between the front refocusable range and the back refocusable range with respect to the first position. For FIGS. 17C and 17D, the second position may be set by the same method as that for FIGS. 17A and 17B. The image processor 105 may calculate the second position on which the focus unit is to be focused so as to provide the second refocusable range so that the width ratio in the optical axis direction between the refocusable ranges before and after the first position in the second refocusable range satisfies the set ratio.

Depending upon the relationship between the specification of the image pickup unit and the in-focus position of the focus unit, a width of the back refocusable range $D_{far}$ may have a calculated value of infinity. In this case, the width ratio in the optical axis direction between the front and back refocusable ranges cannot be calculated and the display unit 106 illustrated in FIG. 1 etc. may display a warning message.

The next step S107 is a step of actually driving the focus unit so that the focus unit is focused on the second position determined by the step S106.

The next step S108 is a step of actually capture an image while the second position is being focused in the step S107. Thereby, the captured image is stored and a series of steps ends.

The refocusable ranges before and after the first position in the first refocusable range are simply compared with the refocusable ranges before and after the second position in the second refocusable range. The fact that back refocusable range is wider than the front refocusable range is applied to both cases. Since the user feels that an image is captured while the first position is being focused, the above procedure enables control over the front and back refocusable range.

The method for finding the second position based on the first position has been described, but another step, such as a confirming step, may be inserted between the two steps.

The display unit 106 may display an image in which the first position is focused, in a period from S102 (first position designating step) to S108 (image pickup step). The displayed image at this time may be a refocused image in which the first position is focused after the focus unit is driven and focused on the second position. Before the image is captured, the image in which the focus unit is actually driven and focused on the first position may be displayed, and just before the image is captured, the focus unit may be driven and focused on the second position. The displayed image may be internally switched between the image in which the focus unit is actually driven and focused by each step and the refocused image.

A preview image stored and reproduced after the image is captured may be displayed as a refocused image in which the first position is focused. Thus, while the user is not conscious of a change of the physical focused position caused by driving of the focus unit, only the front and back refocusable ranges can be controlled.

The above configuration can provide an image pickup apparatus and its control method which can effectively utilize a finite refocusable range, and properly obtain an image having a focused position desired by the user.

Second Embodiment

A description of an image pickup apparatus according to a second embodiment of the present invention. FIG. 1 illustrates a basic structure of the second embodiment, and a description thereof is similar.

Figure 7:
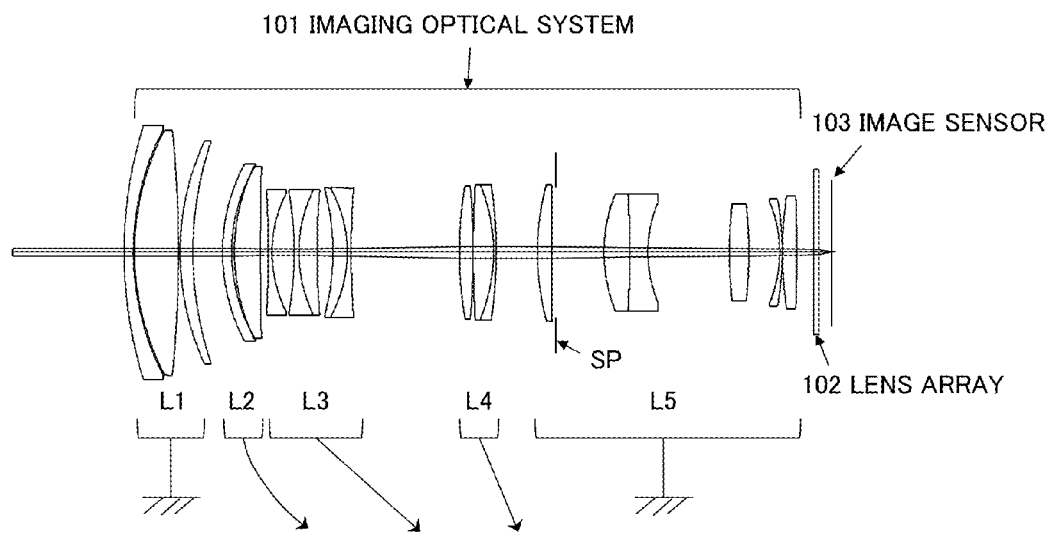
FIG. 7 is a sectional view of the image pickup unit according to the second embodiment of the present invention.

The image pickup unit 100 according to the second embodiment has an arrangement illustrated in FIG. 3, and its sectional view is illustrated in FIG. 7. The imaging optical system 101 is a zoom lens including, in order from the object side, a first lens unit L1 having a positive refractive power, a second lens unit L2 having a positive refractive power, a third lens unit L3 having a negative refractive power, a fourth lens unit L4 having a positive refractive power, and a fifth lens unit L5 having a positive refractive power. In the magnification variation, the first lens unit L1 and the fifth lens unit L5 are fixed, the second lens unit L2, the third lens unit L3, and the fourth lens unit L4 are moved on the optical axis. The second lens unit L2 is driven for focusing. As illustrated in FIG. 3, the lens array 102 is arranged on the object side of the image-side conjugate plane 202 to the object plane 201 of the imaging optical system 101, and the image-side conjugate plane 202 and the image sensor 103 have a conjugate relationship via the lens array 102. The light from the object plane 201 passes the imaging optical system 101 and the lens array 102, and enters different pixels on the image sensor 103, providing the light field. In the configurations illustrated in FIGS. 3 and 4, the image sensor 103 obtains an image in which a plurality of micro images are arranged with different capturing viewpoints and capturing ranges. The configuration illustrated in FIG. 4 is similar to that illustrated in FIG. 3 except that the lens array 102 is arranged on the image side of the image-side conjugate plane 202. The difference from FIG. 3 is that the lens array 102 views as a real object an image formed by the imaging optical system 101 and reimages an image onto the image sensor 103. Both the configurations illustrated in FIGS. 3 and 4 are essentially common in that the lens array 102 views as the object the image formed by the imaging optical system 101 and images the image onto the image sensor 103. Therefore, the following discussion similarly applies to the configuration of FIG. 4.

Figure 10:
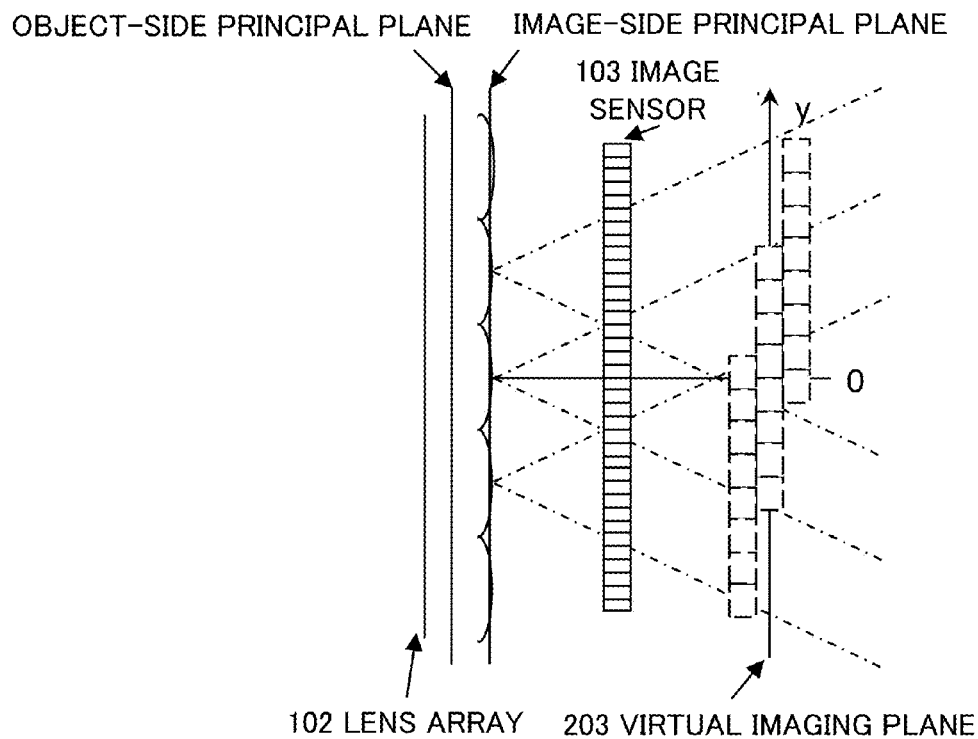
FIG. 10 is an explanatory view of generating a refocused image according to the second embodiment of the present invention.

Next follows a description of an example of refocus processing according to this embodiment. Quantitatively similar to the first embodiment, the images of the divided pupil of the imaging optical system 101 may be overlapped with shift amounts corresponding to the object distance to be focused. Now a concrete method will be described with reference to FIG. 10. FIG. 10 is a detailed view of part of the lens array 102 and the image sensor 103 in the configuration of FIG. 3. The lens array 102 in this embodiment includes micro lenses each of which has a plane on the object side and a convex on the image side. Similar to the first embodiment, the shape of the lens array 102 is not limited. An alternate long and short dash line in FIG. 10 represents an angle of view of each micro lens. Pixel values obtained by the image sensor 103 are projected onto the virtual imaging plane 203 via the micro lenses corresponding to the pixels, and synthesized. Thereby, a refocused image in which a virtual imaging plane 203 is focused can be generated. The virtual imaging plane 203 is a plane conjugate with a plane on an object side to be focused in the refocus via the imaging optical system 101. For example, in order to generate an image in which the object plane 201 is focused in FIG. 3, the virtual imaging plane 203 may be set to the image-side conjugate plane 202. In FIG. 10, each projected pixel in generating the refocused image is represented by a broken line, and drawn in a shifted position for better understanding. The refocused image may be generated by parallel movements and synthesis of the pixels as long as the similar pixel overlapping to the above pixel projecting method is maintained. At this time, as long as the area of the lens array 102 which the light incident on the pixel has passed is identical, the parallel movement amounts of the pixels may be identical. In other words, the pixel operation in the refocused image generation illustrated in FIGS. 3 and 4 depends on the area of the lens array 102 which the light incident on the pixel has passed.

Figure 13:
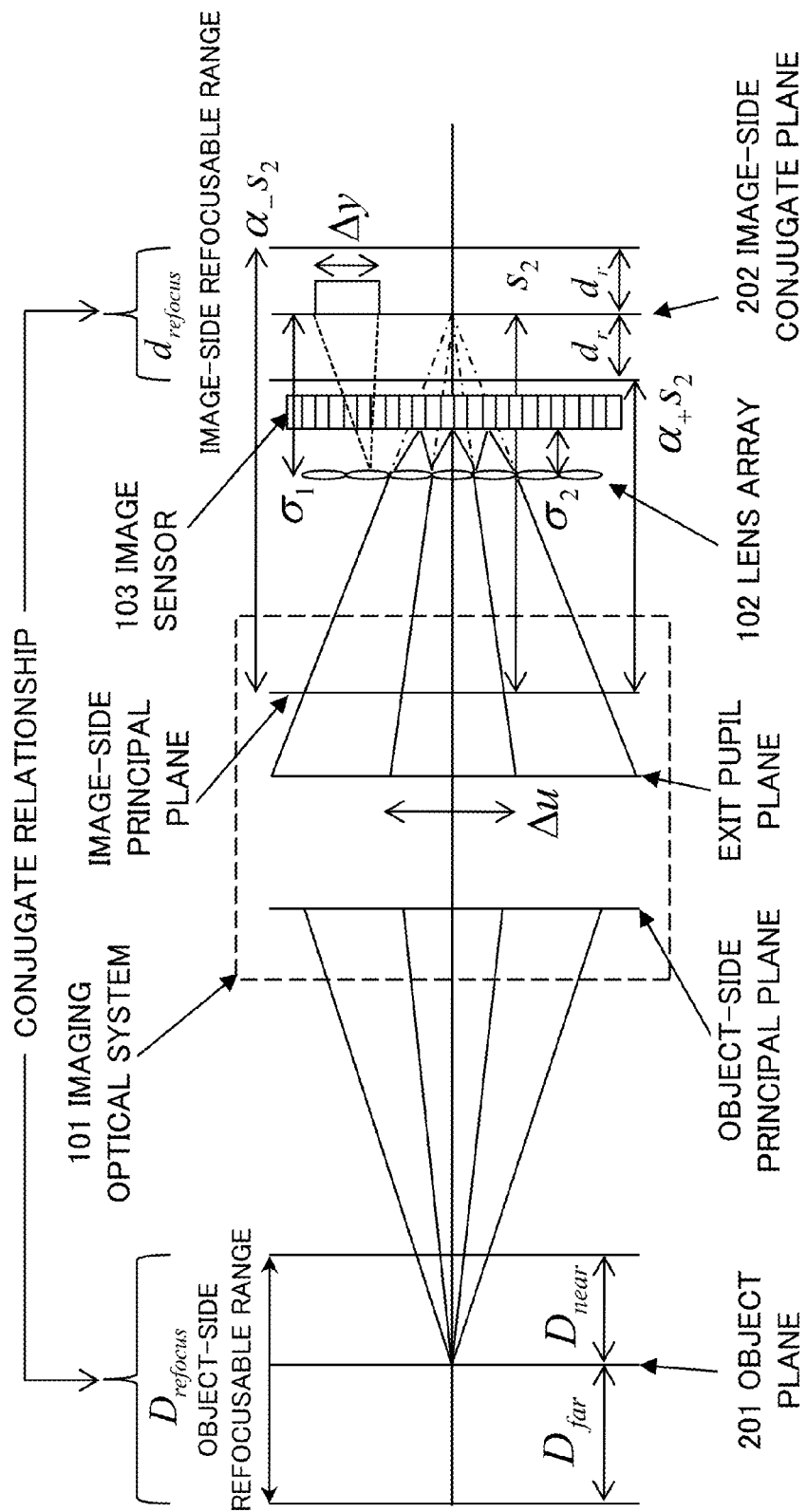
FIG. 13 is an explanatory view of a refocus control range according to the second embodiment of the present invention.

Next follows a description of the refocusable range. The refocusable range in this embodiment is also described by the expression (1) similar to that in the first embodiment. FIG. 13 illustrates the relationship. Δy in FIG. 13 represents a sampling pitch of the two-dimensional intensity distribution of light in FIGS. 3 and 4 and $\Delta y = \Delta\sigma_1/\sigma_2$ is established. This condition is necessary to image and reduce to $\sigma_1/\sigma_2$ an image formed by the imaging optical system 101 onto the image sensor 103 while the lens array 102 views the image as the virtual object. Herein, $\sigma_1$ is a distance between the image-side conjugate plane 202 and the object-side principal plane of the lens array 102, and $\sigma_2$ is a distance between the image-side principal plane of the lens array 102 and the image sensor 103. The expressions (1) can also be approximated to the expression (2) based on $\Delta \ll P$ in the second embodiment.

The process of obtaining the second refocusable range according to the second embodiment is illustrated by the flowchart illustrated in FIG. 16, and a description of the similar part to the first embodiment will be omitted.

The step S105 (FIG. 16) calculates and acquires the second refocusable range of the reconstructed image. The calculating method calculates the image-side refocusable range similar to the first embodiment. From FIG. 13, $NF = \sigma_1/\Delta_{LA}$ is geometrically established. As described above, $\Delta y = \Delta\sigma_1/\sigma_2$ is established, and thus the following expression (12) is established.

$$R_{mono} = \left(\frac{\sigma_2}{\sigma_1}\right)^2 R_{total} \quad (12)$$

The conditional expression (13) which $d_r$ satisfies is found using the above expressions.

$$0.0 < \frac{\Delta_{LA} d_r}{\Delta \sigma_1} \sqrt{\frac{R_{synth}}{R_{total}}} \leq 10.0 \quad (13)$$

The upper and lower limits in the conditional expression (13) have meanings similar to those in the conditional expression (11).

The following conditional expression (13a) may be established so as to increase the sharpness of the reconstructed image.

$$0.0 < \frac{\Delta_{LA} d_r}{\Delta \sigma_1} \sqrt{\frac{R_{synth}}{R_{total}}} \leq 6.0 \quad (13a)$$

The following conditional expression (13b) may be established so as to increase the sharpness of the reconstructed image.

$$0.0 < \frac{\Delta_{LA} d_r}{\Delta \sigma_1} \sqrt{\frac{R_{synth}}{R_{total}}} \leq 3.0 \quad (13b)$$

Table 1 indicates the value in the conditional expression (13). In the second embodiment, the number of effective pixels of the image sensor 103 is $R_{total} = 150.0 \times 10^6$ (pix), $\sigma_1 = 0.3712$ (mm) and $\sigma_2 = 0.0740$ (mm). The pixel pitch of the image sensor 103 is $\Delta = 0.0024$ (mm), and the pitch of the lens array 102 is $\Delta_{LA} = 0.0256$ (mm). The focal length of the imaging optical system 101 at the wide angle end is $f_W = 72.2$ (mm) and that at the telephoto end is $f_T = 194.0$ (mm). The F-number from the wide angle end to the telephoto end is F=2.9, and the number of linear pupil divisions is N=5. The synthesized image resolution designator 111a can select the resolution of the reconstructed image $R_{synth}$ from among three types such as $10.0 \times 10^6$ pix, $6.0 \times 10^6$ pix, and $3.0 \times 10^6$ pix. Table 1 indicates the values of $d_r$ for each resolution. In order to generate the reconstructed image having a resolution of $10.0 \times 10^6$ pix from the single viewpoint image having a resolution of $6.0 \times 10^6$ pix, a high resolution scheme using the pixel shift superresolution etc. may be necessary.

The above configuration can provide an image pickup apparatus and its control method which can effectively utilize a finite refocusable range, and properly obtain an image having a focused position desired by the user.

Third Embodiment

A description will be given of an image pickup apparatus according to a third embodiment of the present invention. FIG. 1 illustrates a basic configuration, and the description is similar to that for the first embodiment.

Figure 15:
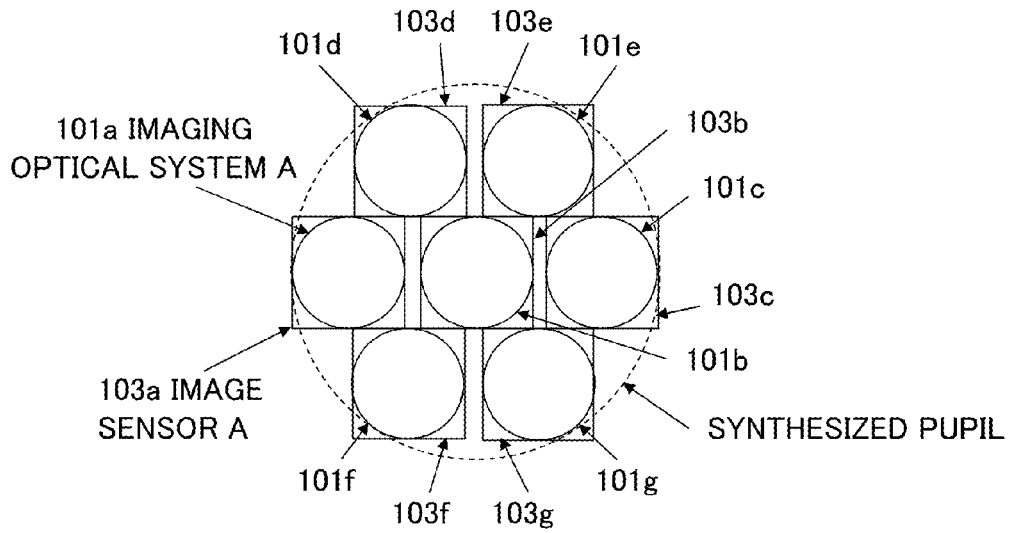
FIG. 15 is a schematic structural view of an image pickup unit according to the third embodiment of the present invention.

The image pickup unit 100 is arranged as illustrated in FIG. 5, and as illustrated in FIG. 15 when viewed from the object side. In the third embodiment, the image pickup unit 100 has a sextet symmetry with respect to an optical axis of an imaging optical system B101b as a rotating axis. Herein, reference numerals 101a to 101g represent imaging optical systems A to G. However, the structure is not limited to this embodiment, and the number of imaging optical systems and their arrangement can be changed. Image sensors 103a to 103g are arranged on the image sides of the imaging optical systems 101a to 101g. A single image sensor may be arranged as long as it can obtain an image formed by each of the imaging optical systems 101a to 101g. The light refracted by each of the imaging optical systems 101a to 101g is received by the corresponding one of image sensors 103a to 103g. Images obtained by the image sensors 103a to 103g are parallax images as a result of observing the object space from different viewpoints. The light field of the object space can be obtained by synthesizing these images.

Figure 8:
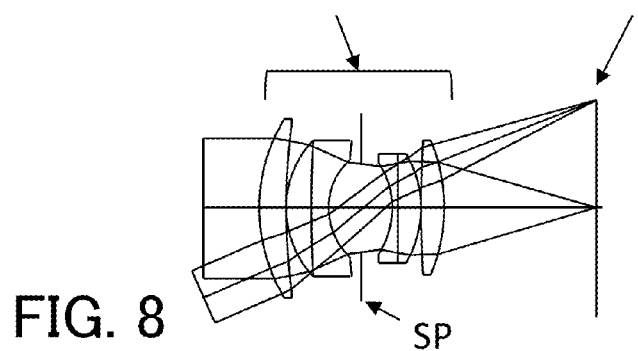
FIG. 8 is a sectional view of an imaging optical system according to the third embodiment of the present invention.

FIG. 8 is a sectional view of the imaging optical system A101a and the image sensor A103a, and the other imaging optical systems 101b to 101g and image sensors 103b to 103g are similarly illustrated. However, each imaging optical system may have a different structure. The imaging optical system A101a illustrated in FIG. 8 is a single focus lens. A distance between the imaging optical system A101a and the image sensor A103 is changed for focusing.

The refocus processing in this embodiment is similar to that for the first embodiment, and images of respective viewpoints may be overlapped with shift amounts corresponding to the object distance to be focused.

Figure 14:
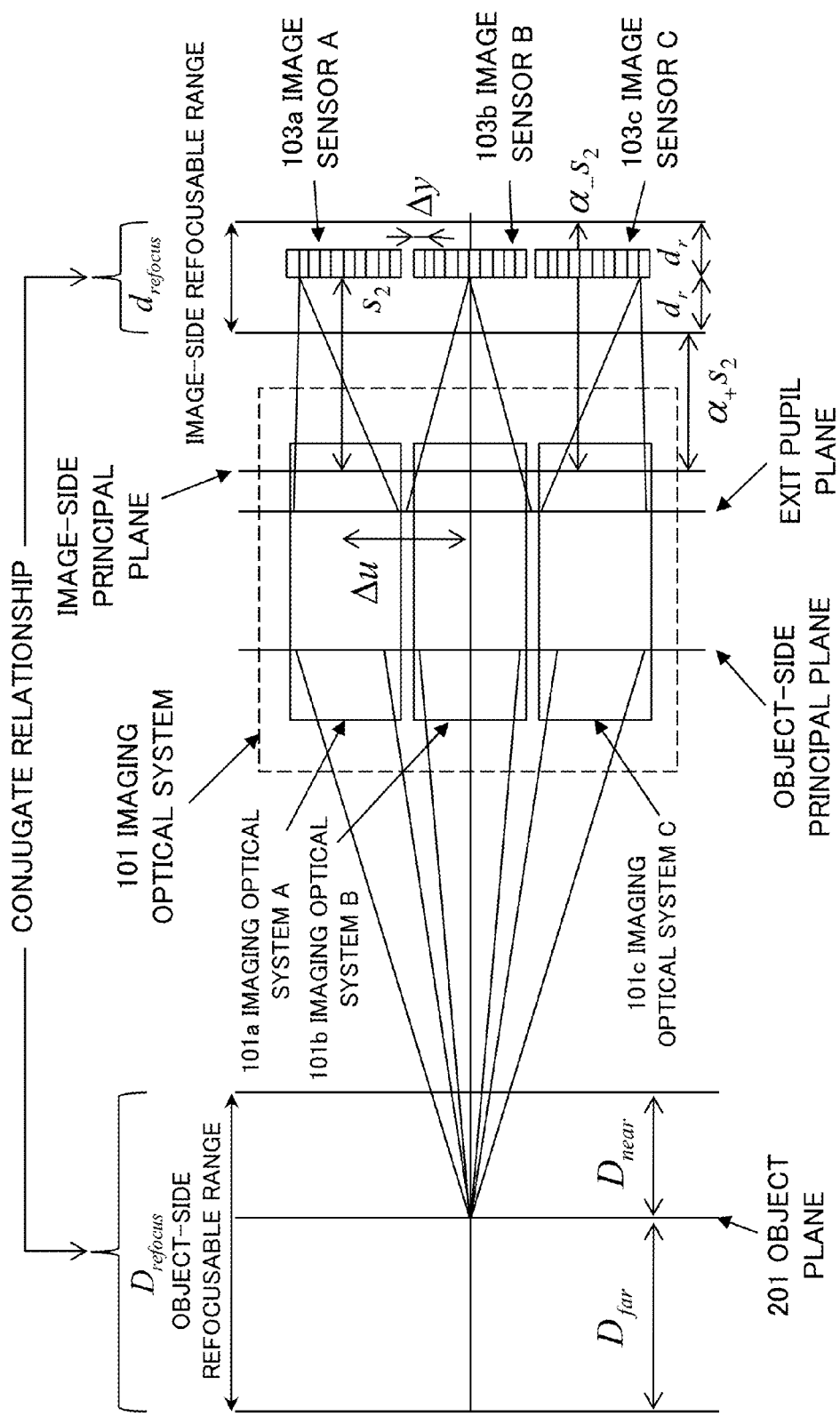
FIG. 14 is an explanatory view of a refocus control range according to the third embodiment of the present invention.

The expression (1) similarly describes the refocusable range. FIG. 14 illustrates the relationship. In the third embodiment, $\Delta y = \Delta$ and $\Delta u = P_{mono}/F_{mono}$. $F_{mono}$ is an F-number of one of the imaging optical systems 101a to 101g, and $P_{mono}$ is an exit pupil distance of the imaging optical system. From $\Delta \ll P_{mono}$, the expression (1) is approximated to the following expression (14).

$$\alpha_{\pm} s_2 = s_2 \mp F_{mono} \Delta y = s_2 \mp F_{mono} \Delta \quad (14)$$

The process of obtaining the second refocusable range in the second embodiment is also illustrated by the flowchart illustrated in FIG. 16, and a description of the similar part to the first embodiment will be omitted.

The step S105 (FIG. 16) calculates and acquires the second refocusable range of the reconstructed image. The calculating method calculates the image-side refocusable range similar to the first embodiment.

The second refocusable range is obtained by substituting the F-number of the imaging optical systems 101a to 101g used for the image pickup obtained in the predicted exposure state for $F_{mono}$. When $R_{mono}$ is a resolution of an image formed by one of the imaging optical systems 101a to 101g which has the F-number of $F_{mono}$, the conditional expression (15) is calculated which $d_r$ needs to satisfy.

$$0.0 < \frac{d_r}{F_{mono}\Delta} \sqrt{\frac{R_{synth}}{R_{mono}}} \leq 10.0 \quad (15)$$

The upper and lower limits in the conditional expression (15) have meanings similar to those in the conditional expression (11).

The following conditional expression (15a) may be established so as to increase the sharpness of the reconstructed image.

$$0.0 < \frac{d_r}{F_{mono}\Delta} \sqrt{\frac{R_{synth}}{R_{mono}}} \leq 6.0 \quad (15a)$$

The following conditional expression (15b) may be established so as to increase the sharpness of the reconstructed image.

$$0.0 < \frac{d_r}{F_{mono}\Delta} \sqrt{\frac{R_{synth}}{R_{mono}}} \leq 3.0 \quad (15b)$$

Table 1 indicates the value in the conditional expression (15). In the third embodiment, the number of effective pixels of the image sensors 103a to 103g is $R_{mono} = 19.3 \times 10^6$ (pix), and the pixel pitch is $\Delta = 0.0012$ (mm). The focal length of each of the imaging optical systems 101a to 101g is f=50.0 (mm), and the maximum aperture is 1.8. In Table 1, the F-number used for the image pickup is $F_{mono} = 1.8$. For a different F-number, $d_r$ is set so as to satisfy the conditional expression (15). The refocusable range is changed in accordance with the light shield on an area having a high angle of field. For example, when the angle-of-field area has a depth of focus twice as high as that for the on-axis area, the refocusable range of the angle-of-field area is set twice as high as that on the on-axis area. The synthesized image resolution designator 111a can select the resolution of the reconstructed image $R_{synth}$ from among three types such as $19.3 \times 10^6$ pix, $10.0 \times 10^6$ pix, and $5.0 \times 10^6$ pix. Table 1 indicates $d_r$ for each resolution.

The above configuration can provide an image pickup apparatus and its control method which can effectively utilize a finite refocusable range, and properly obtain an image having a focused position desired by the user.

Fourth Embodiment

Figure 19:
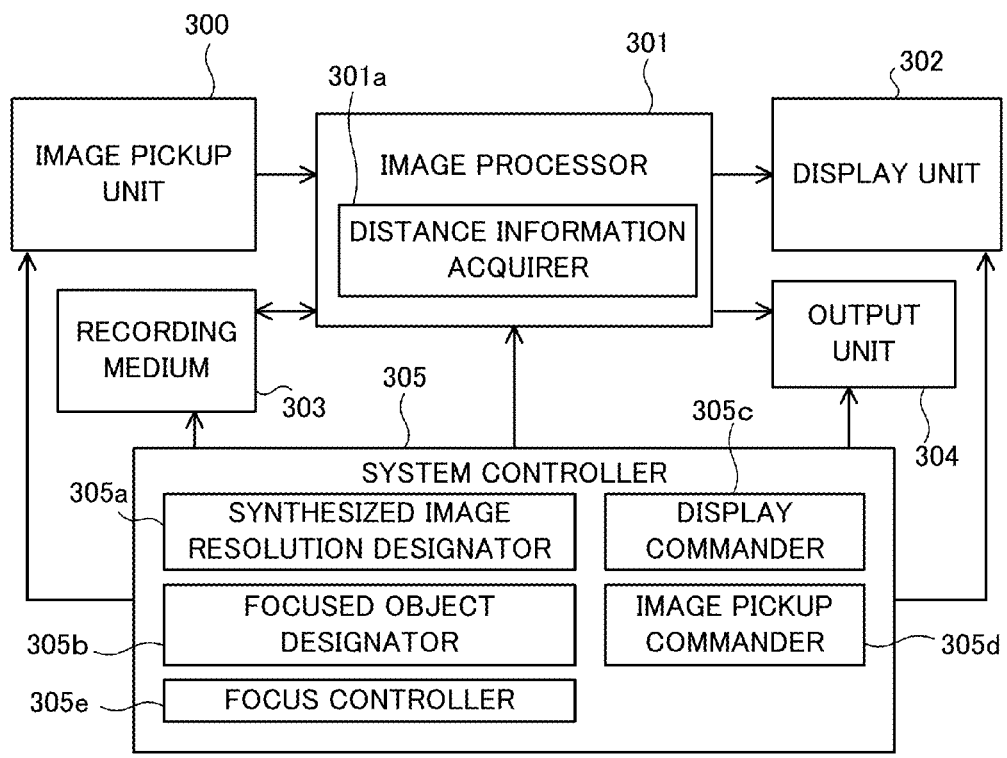
FIG. 19 is a block diagram of an image processing system according to the fourth embodiment of the present invention.
Figure 20:
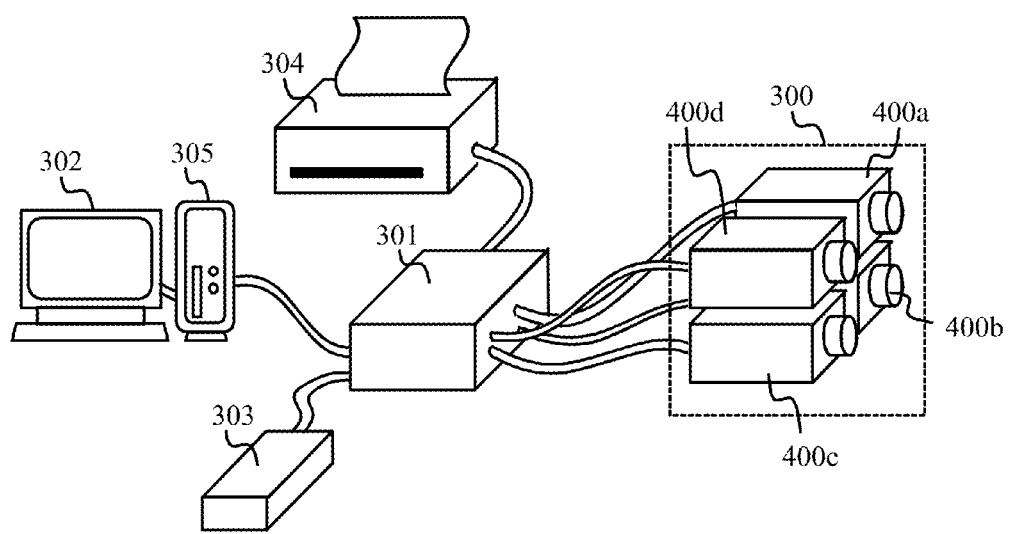
FIG. 20 is a schematic structural view of an image processing system according to the fourth embodiment of the present invention.
Figure 21:
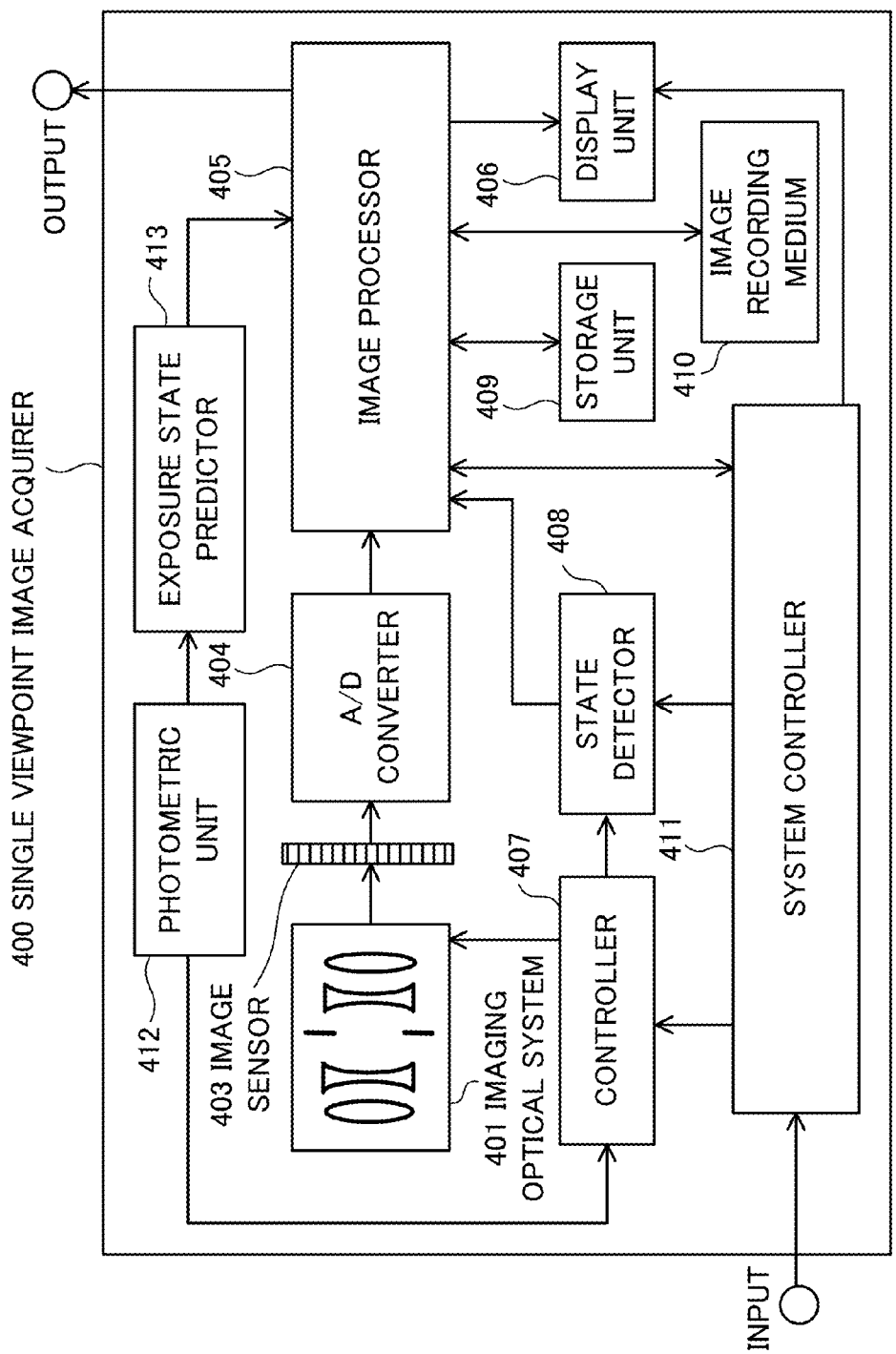
FIG. 21 is a block diagram of a single viewpoint image acquirer according to the fourth embodiment of the present invention.

A description will be given of an image pickup apparatus according to a fourth embodiment of the present invention. FIG. 19 illustrates a basic configuration of the image processing system according to the present invention. FIG. 20 articulates each component in FIG. 19, and each component is designated by the same reference numeral in these figures. A plurality of single viewpoint image acquirers 400a to 400d in FIG. 20 are provided in an image pickup unit 300 illustrated in FIG. 19. FIG. 21 illustrates an internal structure of each single viewpoint image acquirer. Each of the single viewpoint image acquirers 400a to 400d quantitatively has the same structure as that of FIG. 5. The image processor 301 illustrated in FIG. 19 is a computer configured to execute the processing illustrated in FIG. 16. The image processed by the image processor 301 is output to one or more of a display unit 302, a recording medium 303, and an output unit 304. The display unit 302 may be a liquid crystal display, a projector, etc., for example. The recording medium 303 may be a semiconductor memory, a hard disk drive, a server on a network, etc. for example. The output unit 304 may be a printer. The user can confirm an image via the display unit 302 in capturing or editing the image. The image processor 301 serves to provide development processing or other image processing, if necessary, as well as reconstruction processing and processing illustrated in FIG. 16. A system controller 305, such as a PC, controls an operation of each component. The image processor 301 includes a distance information acquirer 301a, and the system controller 305 includes a synthesized image resolution designator 305a, a focused object designator 305b, a display commander 305c, an image pickup commander 305d, and a focus controller 305e. These elements are similar to those in the first embodiment, and a description thereof will be omitted.

In FIG. 21, an image formed by the imaging optical system 401 is converted into a digital signal by an image sensor 403 and an A/D converter 404. An image processor 405 performs predetermined processing for the digital signal and outputs the resultant signal to each component in the single viewpoint image acquirer 400 and the image processor 301. A system controller 411 receives a signal from the system controller 305, and controls each component in the single viewpoint image acquirer 400. An exposure state predictor 413 predicts an exposure state used for the image pickup based on information of a photometric unit 412. A display unit 406 displays or does not display the displayed image via the image processor 405 in accordance with the signal from the system controller 411. In capturing the image in accordance with an instruction from the system controller 411, the controller 407 adjust the exposure of the imaging optical system 401 based on information from the photometric unit 412, and the image is captured. At this time, the image obtained by the image sensor 403 is input to the image processor 405 via the same route as described above, and receives predetermined processing, and is stored in the image recording medium 410, such as a semiconductor memory, in a predetermined format. At the same time, the image acquisition condition used for the image pickup, which has been obtained from the state detector 408, is recorded. The image to be recorded in the image recording medium 410 may be the reconstructed image. For quick processing, the storage unit 409 may store a desired setting and the display unit 406 may display the reconstructed image without intervening the image recording medium 410.

Figure 9:
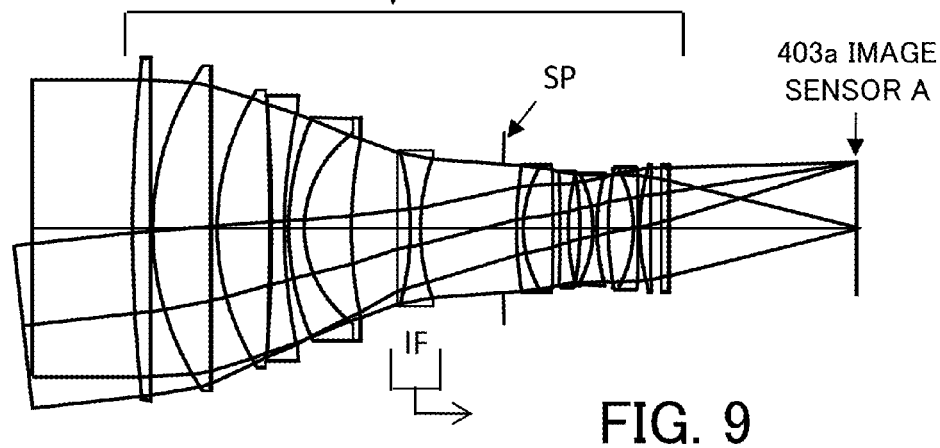
FIG. 9 is a sectional view of an imaging optical system according to a fourth embodiment of the present invention.

The single viewpoint image acquirer 400 includes an imaging optical system, and FIG. 9 is a sectional view, for example, of the imaging optical system A401*a* and the image sensor 403*a*. FIG. 9 illustrates a single focus lens, and the focus unit IF is driven for focusing. The other single viewpoint image acquirers 400*b* to 400*d* are similarly configured. Of course, each single viewpoint image acquirer may have a different configuration, and the number and arrangement thereof are not limited to those of this embodiment.

The refocus processing of this embodiment is similar to that for the third embodiment, and the displayed image is generated in capturing and editing an image similarly to the third embodiment.

Table 1 indicates the value in the conditional expression (15) in the fourth embodiment. In the fourth embodiment, the number of effective pixels of the image sensors 403*a* to 403*d* is $R_{mono}=32.0\times10^6$ (pix), and the pixel pitch is $\Delta=0.0052$ (mm). The focal length of the imaging optical systems 401*a* to 401*d* is f=200.0 (mm), and the open F-number is 2.0. In Table 1, the predicted F-number at the image pickup time is $F_{mono}=2.0$. The synthesized image resolution designator 305*a* can select the resolution of the reconstructed image $R_{synth}$ from among three types such as $64.0\times10^6$ pix, $32.0\times10^6$ pix, and $8.0\times10^6$ pix. Table 1 indicates $d_r$ corresponding to each resolution. In order to generate the reconstructed image having a resolution of $64.0\times10^6$ pix, a high resolution scheme using the pixel shift superresolution etc. may be necessary.

The above configuration can provide an image pickup apparatus and its control method which can effectively utilize a finite refocusable range, and properly obtain an image having a focused position desired by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

TABLE 1

First embodiment

| $R_{total}$ (pix) | σ (mm) | | |
|---|---|---|---|
| $46.7 \times 10^6$ | 0.0374 | | |

| $R_{synth}$ (pix) | $d_r$ (mm) | Conditional expression (11) | |
|---|---|---|---|
| $8.0 \times 10^6$ | 0.2260 | 2.5 | |
| $5.2 \times 10^6$ | 0.6166 | 5.5 | |
| $2.0 \times 10^6$ | 1.7174 | 9.5 | |

Second embodiment

| $R_{total}$ (pix) | Δ (mm) | $\Delta_{LA}$ (mm) | $\sigma_1$ (mm) |
|---|---|---|---|
| $150.0 \times 10^6$ | 0.0024 | 0.0256 | 0.3712 |

| $R_{synth}$ (pix) | $d_r$ (mm) | Conditional expression (13) | |
|---|---|---|---|
| $10.0 \times 10^6$ | 1.3208 | 9.8 | |
| $6.0 \times 10^6$ | 0.9918 | 5.7 | |
| $3.0 \times 10^6$ | 0.6398 | 2.6 | |

Third embodiment

| $R_{mono}$ (pix) | Δ (mm) | $F_{mono}$ | |
|---|---|---|---|
| $19.3 \times 10^6$ | 0.0012 | 1.8 | |

| $R_{synth}$ (pix) | $d_r$ (mm) | Conditional expression (15) | |
|---|---|---|---|
| $19.3 \times 10^6$ | 0.0060 | 2.8 | |
| $10.0 \times 10^6$ | 0.0171 | 5.7 | |
| $5.0 \times 10^6$ | 0.0407 | 9.6 | |

Fourth embodiment

| $R_{mono}$ (pix) | Δ (mm) | $F_{mono}$ | |
|---|---|---|---|
| $32.0 \times 10^6$ | 0.0052 | 2.0 | |

| $R_{synth}$ (pix) | $d_r$ (mm) | Conditional expression (15) | |
|---|---|---|---|
| $64.0 \times 10^6$ | 0.0162 | 2.2 | |
| $32.0 \times 10^6$ | 0.0187 | 1.8 | |
| $8.0 \times 10^6$ | 0.0249 | 1.2 | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-084224, filed Apr. 16, 2014, which is hereby incorporated by reference herein in its entirety.

What is claimed is:

1. An image pickup apparatus comprising:
an image sensor; and
a controller configured to:
drive a focus unit so that a first position is focused;
acquire a first refocusable range that is available in an image if the image is captured while the first position is focused;
acquire refocusable range setting information;
determine a second position, different from the first position, to be focused so as to provide a second refocusable range that contains the first position, using information of the first position, the acquired first refocusable range, and the acquired refocusable range setting information;
drive the focus unit so that the second position is focused; and
make the image sensor capture an image while the second position, wherein the refocusable range setting information contains a width ratio in an optical axis direction between a near side refocusable range and a far side refocusable range from the first position in the second refocusable range.

2. The image pickup apparatus according to claim 1, further comprising an image processor configured to provide refocus processing on the image captured by the image sensor.

3. The image pickup apparatus according to claim 2, further comprising a display unit configured to display a refocused image in which the first position is focused, in reproducing the image captured by the image sensor while the second position is focused.

4. The image pickup apparatus according to claim 1, wherein the controller acquires the first refocusable range based on object distance information.

5. The image pickup apparatus according to claim 4, wherein the controller acquires the object distance information based on parallax information in the image captured by the image sensor.

6. The image pickup apparatus according to claim 1, wherein the controller acquires the first refocusable range based on an optical information of an optical system including the focus unit, while the first position is focused.

7. The image pickup apparatus according to claim 6, wherein the optical information is obtained according to an angle-of-view area of the image captured by the image sensor while the first position is focused.

8. The image pickup apparatus according to claim 1, further comprising a storage unit configured to store information on a refocusable range for a position to be focused, wherein the controller acquires the first refocusable range from the storage unit.

9. The image pickup apparatus according to claim 1, further comprising a storage unit configured to store information on a refocusable range for a position to be focused, wherein the controller acquires the refocusable range setting information from the storage unit.

10. The image pickup apparatus according to claim 1, wherein the controller determines the second position by driving the focus unit and by calculating a refocusable range for a position to be focused.

11. The image pickup apparatus according to claim 1, wherein the second refocusable range satisfies the width ratio.

12. A control method for an image pickup apparatus including an image sensor, the control method comprising the steps of:
driving a focus unit so that a first position is focused;
acquiring a first refocusable range that is available in an image if the image is captured while the first position is focused;
acquiring refocusable range setting information;
determining a second position, different from the first position, to be focused so as to provide a second refocusable range that contains the first position, using information of the first position, the acquired first refocusable range, and the acquired refocusable range setting information;
drive the focus unit so that the second position is focused; and
making the image sensor capture an image while the second position, wherein the refocusable range setting information contains a width ratio in an optical axis direction between a near side refocusable range and a far side refocusable range from the first position in the second refocusable range.

13. A non-transitory computer readable medium configured to store a program that enables a computer to execute a control method for an image pickup apparatus that includes an image sensor,
wherein the control method comprises the steps of:
driving a focus unit so that a first position is focused;
acquiring a first refocusable range that is available in an image if the image is captured while the first position is focused;
acquiring refocusable range setting information;
determining a second position, different from the first position, to be focused so as to provide a second refocusable range that contains the first position, using information of the first position, the acquired first refocusable range, and the acquired refocusable range setting information;
drive the focus unit so that the second position is focused; and
making the image sensor capture an image while the second position, wherein the refocusable range setting information contains a width ratio in an optical axis direction between a near side refocusable range and a far side refocusable range from the first position in the second refocusable range.

* * * * *